(12) United States Patent
Rekimoto

(10) Patent No.: US 8,897,499 B2
(45) Date of Patent: Nov. 25, 2014

(54) POSITION DETECTION SYSTEM, POSITION DETECTION METHOD, PROGRAM, OBJECT DETERMINATION SYSTEM AND OBJECT DETERMINATION METHOD

(75) Inventor: Junichi Rekimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1207 days.

(21) Appl. No.: 12/416,266

(22) Filed: Apr. 1, 2009

(65) Prior Publication Data

US 2009/0252375 A1 Oct. 8, 2009

(30) Foreign Application Priority Data

Apr. 4, 2008 (JP) ................................ P2008-098615

(51) Int. Cl.
*G06K 9/46* (2006.01)
*G06T 7/00* (2006.01)
*G06F 3/042* (2006.01)
*G06F 3/01* (2006.01)

(52) U.S. Cl.
CPC .............. *G06T 7/004* (2013.01); *G06F 3/0425* (2013.01); *G06T 2207/10152* (2013.01); *G06F 3/017* (2013.01)
USPC .......................................... 382/115; 382/203

(58) Field of Classification Search
CPC . G01S 17/89; G06F 3/04883; G06K 9/00375; G06K 9/6215
USPC ............ 382/291, 103, 203; 345/156; 715/863
See application file for complete search history.

(56) References Cited

U.S. PATENT DOCUMENTS 4,733,062 A * 3/1988 Horikawa .................. 250/201.8
6,100,538 A * 8/2000 Ogawa ..................... 250/559.29
(Continued)

FOREIGN PATENT DOCUMENTS

| JP | 2002-213947 | 7/2002 |
| JP | 3997566 | 8/2007 |
| JP | 2008-070343 | 3/2008 |

OTHER PUBLICATIONS

Yoo et al., Computer Vision and Image Understanding: A novel non-intrusive eye gaze estimation using cross-ratio under large head motion, Apr. 2005, Elsevier, vol. 98 Issue 1, pp. 25-51.*

(Continued)

*Primary Examiner* — Matthew Bella
*Assistant Examiner* — Dennis Rosario
(74) *Attorney, Agent, or Firm* — Finnegan, Henderson, Farabow, Garrett & Dunner, L.L.P.

(57) ABSTRACT

There is provided a position detection system including an imaging unit to capture an image of a projection plane of an electromagnetic wave, an electromagnetic wave emission unit to emit the electromagnetic wave to the projection plane, a control unit to control emission of the electromagnetic wave by the electromagnetic wave emission unit, and a position detection unit including a projected image detection section to detect a projected image of an object existing between the electromagnetic wave emission unit and the projection plane based on a difference between an image of the projection plane captured during emission of the electromagnetic wave by the electromagnetic wave emission unit and an image of the projection plane captured during no emission of the electromagnetic wave, and a position detection section to detect a position of the object based on a position of the projected image of the object.

12 Claims, 14 Drawing Sheets

(56) References Cited

U.S. PATENT DOCUMENTS

| | | | | |
|---|---|---|---|---|
| 6,144,366 | A * | 11/2000 | Numazaki et al. | 345/156 |
| 6,441,888 | B1 * | 8/2002 | Azuma et al. | 356/4.01 |
| 6,512,844 | B2 * | 1/2003 | Bouguet et al. | 382/154 |
| 6,538,751 | B2 * | 3/2003 | Ono | 356/614 |
| 7,826,728 | B2 * | 11/2010 | Konno et al. | 396/16 |
| 8,589,824 | B2 * | 11/2013 | Hillis et al. | 715/863 |
| 2005/0239548 | A1 * | 10/2005 | Ueshima et al. | 463/36 |
| 2008/0259051 | A1 * | 10/2008 | Ota | 345/175 |

OTHER PUBLICATIONS

Park, Lecture Notes in Computer Science: Practical Gaze Detection by Auto Pan/Tilt Vision System, 2003, Springer-Verlag Berlin Heidelberg, vol. 2869/2003, pp. 372-380.*

Yoo et al., Non-contact Eye Gaze Tracking System by Mapping of Corneal Reflections, May 20-21, 2002, Fifth IEEE International Conference on Automatic Face and Gesture Recognition, 2002, pp. 94-99.*

* cited by examiner

FIG.4
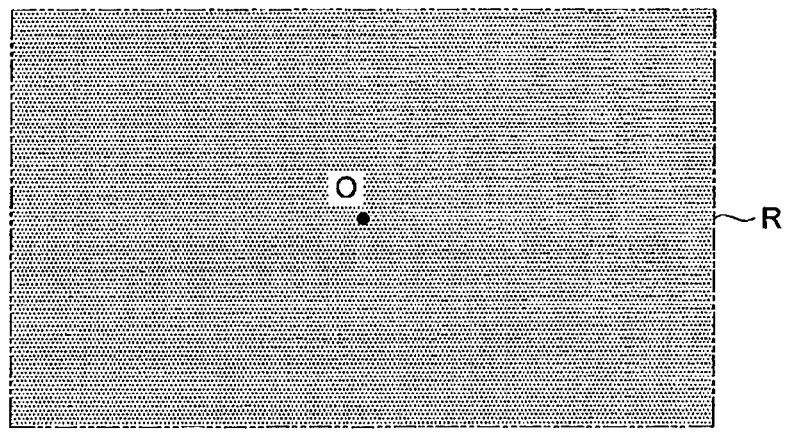
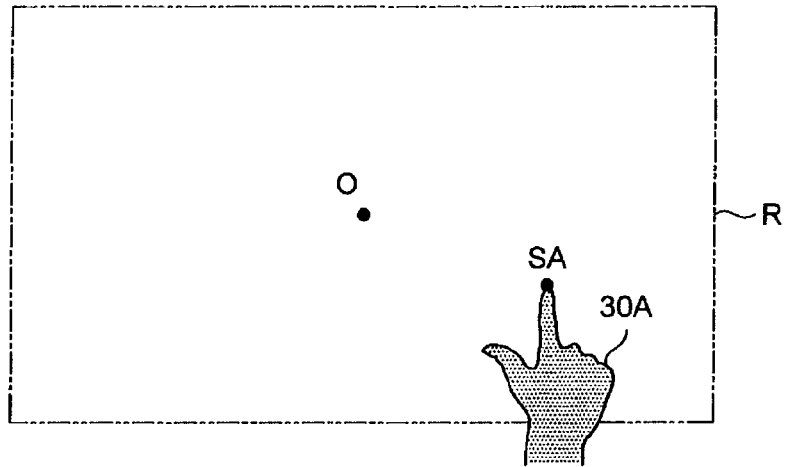
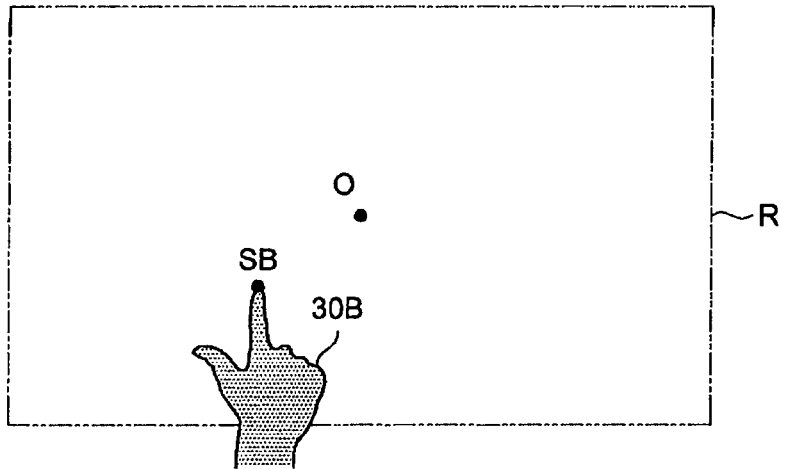

FIG.13
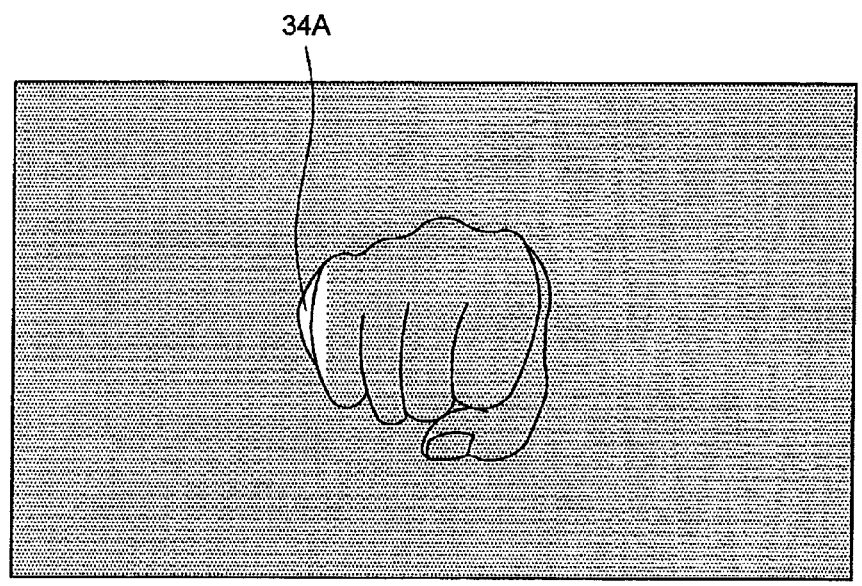
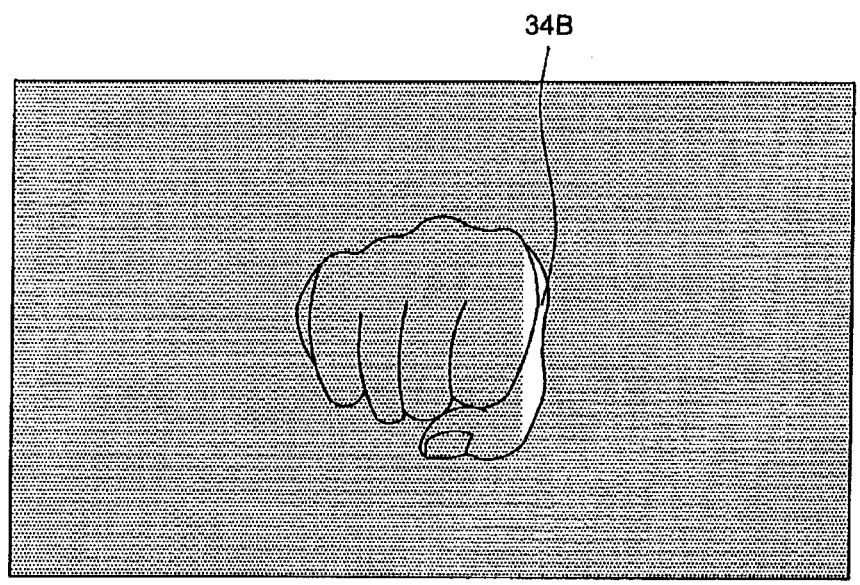

POSITION DETECTION SYSTEM, POSITION DETECTION METHOD, PROGRAM, OBJECT DETERMINATION SYSTEM AND OBJECT DETERMINATION METHOD

CROSS REFERENCES TO RELATED APPLICATIONS

The present invention contains subject matter related to Japanese Patent Application JP2008-098615 filed in the Japan Patent Office on Apr. 4, 2008, the entire contents of which being incorporated herein by reference.

BACKGROUND OF THE INVENTION

1. Field of the Invention

The present invention relates to a position detection system, a position detection method, a program, an object determination system and an object determination method.

2. Description of the Related Art

Studies of new interfaces for inputting information to information processing units such as a PC (Personal Computer) and a cellular phone are widely conducted today. For example, an interface is proposed that captures the image of an operator by an imaging unit, extracts the hand, finger or the like of the operator from the captured image and detects the motion (gesture) of the extracted hand or finger as an input operation.

In order to appropriately detect the input operation of an operator in such an interface, it is important to efficiently and accurately extract the hand, finger or the like of the operator from a background image. Thus, studies on the extraction of the hand or finger of an operator are widely conducted. For example, Japanese Patent No. 3997566 discloses a method that stores an image captured during non-operation by an operator as a reference image and then calculates a difference between the reference image and an image captured during operation by the operator to thereby detect the hand or finger of the operator.

SUMMARY OF THE INVENTION

However, a background image captured by an imaging unit is not necessarily static, and lighting conditions can vary. Therefore, the method according to related art that uses an image captured during non-operation by an operator as a reference image has a drawback that the recognition rate for the hand or finger of the operator decreases if there is a change in environment from the time when the reference image is captured.

In light of the foregoing, it is desirable to provide a novel and improved position detection system, a position detection method, a program, an object determination system and an object determination method capable of detecting an object such as the band or finger of an operator more accurately.

According to an embodiment of the present invention, there is provided a position detection system including an imaging unit to capture an image of a projection plane of an electromagnetic wave, an electromagnetic wave emission unit to emit the electromagnetic wave to the projection plane, a control unit to control emission of the electromagnetic wave by the electromagnetic wave emission unit, and a position detection unit including a projected image detection section to detect a projected image of an object existing between the electromagnetic wave emission unit and the projection plane based on a difference between an image of the projection plane captured during emission of the electromagnetic wave by the electromagnetic wave emission unit and an image of the projection plane captured during no emission of the electromagnetic wave and a position detection section to detect a position of the object based on a position of the projected image of the object.

In this configuration, during emission of the electromagnetic wave by the electromagnetic wave emission unit, the object existing between the electromagnetic wave emission unit and the projection plane blocks the electromagnetic wave, and therefore the projection plane on which a projected image of the object is formed is captured by the imaging unit. The electromagnetic wave emitted from the electromagnetic wave emission unit reaches a background portion different from the projected image of the object on the projection plane. On the other hand, during no emission of the electromagnetic wave by the electromagnetic wave emission unit, the electromagnetic wave emitted from the electromagnetic wave emission unit does not reach the projection plane at all. Accordingly, the projected image detection section can detect the projected image of the object based on a difference between the image captured during emission of the electromagnetic wave and the image captured during no emission of the electromagnetic wave. Further, a formation position of the projected image of the object depends on the positional relationship of the electromagnetic wave emission unit and the object. Thus, the position detection section can rationally detect the position of the object based on the formation position of the projected image of the object detected by the projected image detection section.

The imaging unit may capture a frame image in synchronization with a prescribed synchronizing signal, and the control unit may control emission of the electromagnetic wave by the electromagnetic wave emission unit in synchronization with the prescribed synchronizing signal.

The electromagnetic wave emission unit may include a first electromagnetic wave emission unit and a second electromagnetic wave emission unit placed in a different position from the first electromagnetic wave emission unit, the control unit may switch among emission of the electromagnetic wave by the first electromagnetic wave emission unit, emission of the electromagnetic wave by the second electromagnetic wave emission unit, and no emission of the electromagnetic wave by the first electromagnetic wave emission unit and the second electromagnetic wave emission unit, the projected image detection section may detect a projected image of the object from a first image captured during emission of the electromagnetic wave by the first electromagnetic wave emission unit and detect a projected image of the object from a second image captured during emission of the electromagnetic wave by the second electromagnetic wave emission unit, and the position detection section may detect a spatial position of the object based on positions of the projected images of the object detected from the first image and the second image.

The position detection unit may further include an estimation section to estimate a straight line connecting the first electromagnetic wave emission unit and the projected image of the object based on the position of the projected image of the object detected from the first image and estimate a straight line connecting the second electromagnetic wave emission unit and the projected image of the object based on the position of the projected image of the object detected from the second image, and the position detection section may detect an intersection of the straight lines estimated by the estimation section as the spatial position of the object.

The control unit may periodically switch among emission of the electromagnetic wave by the first electromagnetic wave emission unit, emission of the electromagnetic wave by the second electromagnetic wave emission unit, and no emission of the electromagnetic wave by the first electromagnetic wave emission unit and the second electromagnetic wave emission unit, and the projected image detection section may detect the projected image of the object based on a difference between the first image and an image captured during no emission of the electromagnetic wave by the first electromagnetic wave emission unit and the second electromagnetic wave emission unit in the same cycle as the first image and detect the projected image of the object based on a difference between the second image and an image captured during no emission of the electromagnetic wave by the first electromagnetic wave emission unit and the second electromagnetic wave emission unit in the same cycle as the second image.

The position detection system may further include a filter to transmit a wavelength component of the electromagnetic wave emitted from the electromagnetic wave emission unit, and the imaging unit may capture an image of the projection plane through the filter.

The electromagnetic wave emission unit may emit infrared rays or visible rays.

According to another embodiment of the present invention, there is provided a position detection method including the steps of switching between emission and no emission of an imageable electromagnetic wave by an electromagnetic wave emission unit, capturing an image of a projection plane of the electromagnetic wave emitted from the electromagnetic wave emission unit, detecting a projected image of an object existing between the electromagnetic wave emission unit and the projection plane based on a difference between an image of the projection plane captured during emission of the electromagnetic wave by the electromagnetic wave emission unit and an image of the projection plane captured during no emission of the electromagnetic wave, and detecting a position of the object based on a position of the projected image of the object.

According to another embodiment of the present invention, there is provided a program causing a computer to implement functions including a control section to switch between emission and no emission of an imageable electromagnetic wave by an electromagnetic wave emission unit, a projected image detection section to detect a projected image of an object existing between the electromagnetic wave emission unit and a projection plane based on a difference between an image of the projection plane captured during emission of the electromagnetic wave by the electromagnetic wave emission unit and an image of the projection plane captured during no emission of the electromagnetic wave, the images being captured by an imaging unit, to capture an image of the projection plane of the electromagnetic wave emitted from the electromagnetic wave emission unit, and a position detection section to detect a position of the object based on a position of the projected image of the object.

According to another embodiment of the present invention, there is provided an object determination system including a first electromagnetic wave emission unit to emit an electromagnetic wave in a prescribed direction, a second electromagnetic wave emission unit to emit an electromagnetic wave in a direction to intersect the electromagnetic wave emitted from the first electromagnetic wave emission unit, an imaging unit to capture an image of an object existing in an intersection range of the electromagnetic wave emitted from the first electromagnetic wave emission unit and the electromagnetic wave emitted from the second electromagnetic wave emission unit, the imaging unit capable of imaging the electromagnetic waves emitted from the first electromagnetic wave emission unit and the second electromagnetic wave emission unit, a control unit to switch emission of the electromagnetic waves by the first electromagnetic wave emission unit and the second electromagnetic wave emission unit, and a determination unit including a wave receiving portion detection section to detect a wave receiving portion of the object receiving the electromagnetic wave emitted from the first electromagnetic wave emission unit from a first image captured during emission of the electromagnetic wave by the first electromagnetic wave emission unit and detect a wave receiving portion of the object receiving the electromagnetic wave emitted from the second electromagnetic wave emission unit from a second image captured during emission of the electromagnetic wave by the second electromagnetic wave emission unit and a determination section to make a determination about a physical shape of the object according to proximity between the wave receiving portions detected from the first image and the second image.

According to another embodiment of the present invention, there is provided an object determination method including the steps of switching emission of electromagnetic waves by a first electromagnetic wave emission unit to emit an imageable electromagnetic wave in a prescribed direction and a second electromagnetic wave emission unit to emit an electromagnetic wave in a direction to intersect the electromagnetic wave emitted from the first electromagnetic wave emission unit, capturing an image of an object existing in an intersection range of the electromagnetic wave emitted from the first electromagnetic wave emission unit and the electromagnetic wave emitted from the second electromagnetic wave emission unit, detecting a wave receiving portion of the object receiving the electromagnetic wave emitted from the first electromagnetic wave emission unit from a first image captured during emission of the electromagnetic wave by the first electromagnetic wave emission unit and detecting a wave receiving portion of the object receiving the electromagnetic wave emitted from the second electromagnetic wave emission unit from a second image captured during emission of the electromagnetic wave by the second electromagnetic wave emission unit, and making a determination about a physical shape of the object according to proximity between the wave receiving portions detected from the first image and the second image.

According to another embodiment of the present invention, there is provided a program causing a computer to implement functions including a control section to switch emission of electromagnetic waves by a first electromagnetic wave emission unit to emit an image able electromagnetic wave in a prescribed direction and a second electromagnetic wave emission unit to emit an electromagnetic wave in a direction to intersect the electromagnetic wave emitted from the first electromagnetic wave emission unit, a wave receiving portion detection section to detect a wave receiving portion of the object receiving the electromagnetic wave emitted from the first electromagnetic wave emission unit from a first image captured during emission of the electromagnetic wave by the first electromagnetic wave emission unit and detect a wave receiving portion of the object receiving the electromagnetic wave emitted from the second electromagnetic wave emission unit from a second image captured during emission of the electromagnetic wave by the second electromagnetic wave emission unit, the first image and the second image being captured by an imaging unit to capture an image of an object existing in an intersection range of the electromagnetic wave emitted from the first electromagnetic wave emission unit and the electromagnetic wave emitted from the second electromagnetic wave emission unit, and a determination section to make a determination about a physical shape of the object according to proximity between the wave receiving portions detected from the first image and the second image.

According to another embodiment of the present invention, there is provided a position detection system including an imaging unit to capture an image of a projection plane of an electromagnetic wave, a first electromagnetic wave emission unit to emit an electromagnetic wave imageable by the imaging unit to the projection plane, a second electromagnetic wave emission unit placed in a different position from the first electromagnetic wave emission unit, a control unit to switch emission of electromagnetic waves by the first electromagnetic wave emission unit and the second electromagnetic wave emission unit, and a position detection unit including a projected image detection section to detect a projected image of an object existing between the first electromagnetic wave emission unit and the projection plane from a first image captured during emission of the electromagnetic wave by the first electromagnetic wave emission unit and detect a projected image of the object from a second image captured during emission of the electromagnetic wave by the second electromagnetic wave emission unit, and a position detection section to detect a spatial position of the object based on positions of the projected images of the object detected from the first image and the second image.

The position defection unit may further include an estimation section to estimate a straight line connecting the first electromagnetic wave emission unit and the projected image of the object based on the position of the projected image of the object detected from the first image and estimate a straight line connecting the second electromagnetic wave emission unit and the projected image of the object based on the position of the projected image of the object detected from the second image, and the position detection section may detect an intersection of the straight lines estimated by the estimation section as the spatial position of the object.

According to the embodiments of the present invention described above, it is possible to detect an object such as the hand or finger of an operator more accurately.

BRIEF DESCRIPTION OF THE DRAWINGS

FIG. 4 is an explanatory view showing specific examples of frame images in each light emission state of LEDs.

FIG. 13 is an explanatory view showing other specific examples of frame images.

DETAILED DESCRIPTION OF THE PREFERRED EMBODIMENTS

Figure 1:
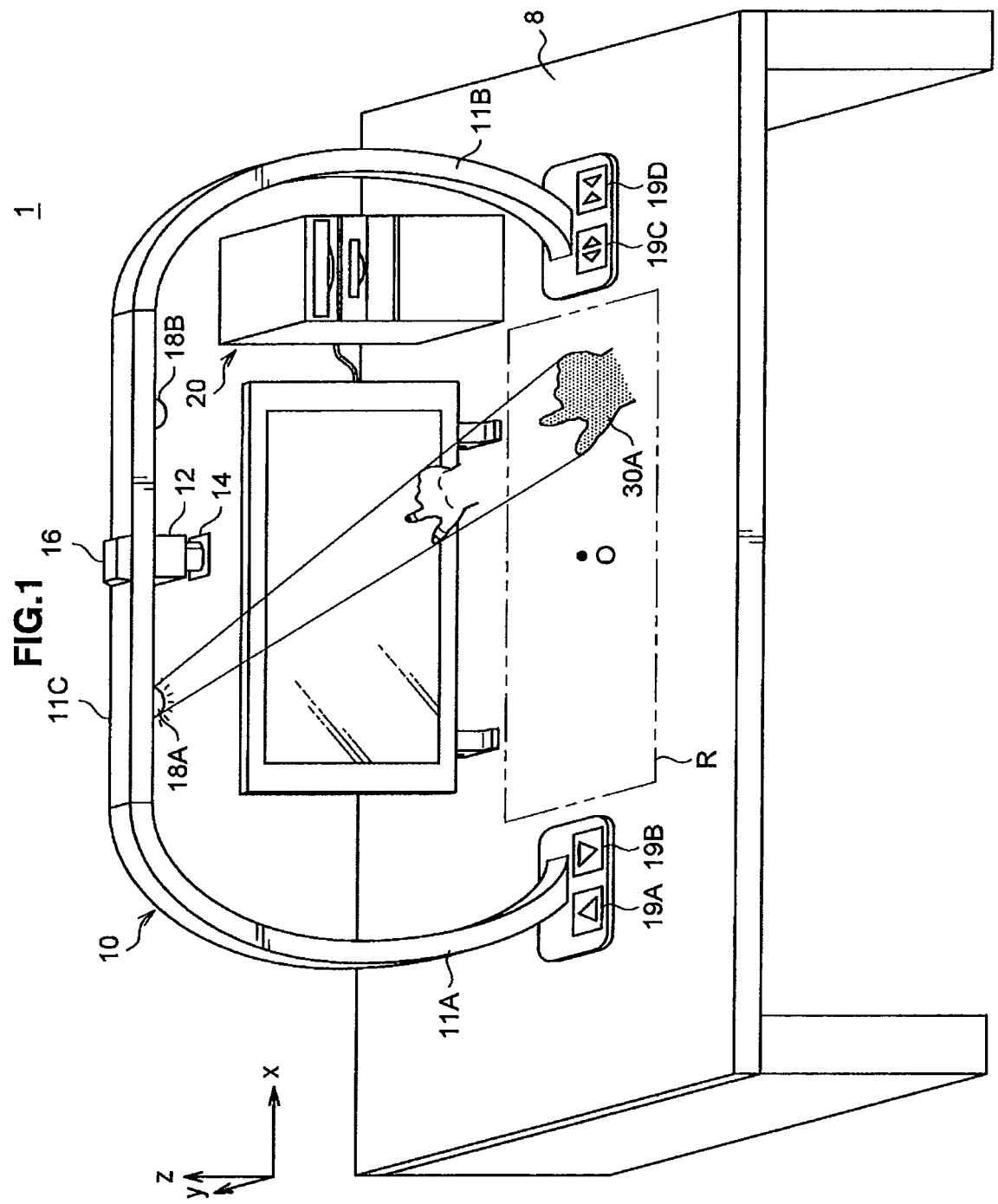
FIG. 1 is an outline view showing the exemplary configuration of a position detection system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described in the following order:

(1) First embodiment
  (1-1) Circumstances of development of the first embodiment
  (1-2) Outline of the position defection system according to the first embodiment
  (1-3) Light emission control by the light emission control unit
  (1-4) Detection of a projected image from a frame image
  (1-5) Spatial position detection
  (1-6) A series of operations by the position detection system
  (1-7) Summary of the first embodiment
  (1-8) Supplementary explanation to the first embodiment
    (Alternative example 1)
    (Alternative example 2)
(2) Second embodiment
  (2-1) Circumstances of development of the second embodiment
  (2-2) Outline of the tip detection system according to the second embodiment
  (2-3) Detection of a tip from a frame image
  (2-4) A series of operations by the tip detection system
  (2-5) Summary of the second embodiment
  (2-6) Supplementary explanation to the second embodiment
(3) Overall supplementary explanation (1) First Embodiment (1-1) Circumstances of Development of the First Embodiment Various interfaces that capture the image of an operator by an imaging unit, extract the hand, finger or the like of the operator from the captured image and detect the motion (gesture) of the extracted hand or finger as an input operation have been proposed heretofore.

In order to appropriately detect the input operation of an operator in such interfaces, it is important to efficiently and accurately extract the hand, finger or the like of the operator from a background image. However, the background image can contain the body image of the operator or the background image is not static in some cases. In this case, it is difficult to appropriately detect the hand, finger or the like of the operator from the background image. Further, lighting conditions can vary, and the recognition rate for the input operation decreases significantly in this case also.

Given such circumstances, a position detection system 1 according to a first embodiment of the present invention has been invented. The position detection system 1 according to the embodiment detects an input operation by recognizing a projected image of the hand or finger of an operator, not the actual hand or finger. Because the projected image has a higher contrast than the actual hand or finger, the position detection system 1 according to the embodiment is capable of easily extracting the hand, finger or the like of an operator from a background image. Further, the position detection system 1 according to the embodiment is capable of detecting the spatial position of the hand, finger or the like of an operator. The position detection system 1 according to the first embodiment of the present invention is described hereinbelow.

(1-2) Outline of the Position Detection System According to the First Embodiment The outline of the position detection system 1 according to the first embodiment of the present invention is described hereinafter with reference to FIG. 1.

FIG. 1 is an outline view showing the exemplary configuration of the position detection system 1 according to the first embodiment of the present invention. Referring to FIG. 1, the position detection system 1 according to the embodiment includes an image transmission unit 10 and a PC (Personal Computer) 20.

The image transmission unit 10 includes a curved portion 11A, a curved portion 11B, a rail portion 11C, an imaging unit 12, an IR (Infrared) transmission filter 14, a light emission control unit 16, a LED (Light Emitting Diode) 18A, a LED 18B, an up button 19A, a down button 19B, a separate button 19C and a close button 19D.

The LED 18A and the LED 18B emit infrared rays intermittently according to control by the light emission, control unit 16. The LED 18A and the LED 18B are mounted on the rail portion 11C having a rail groove and slid along the rail groove manually or automatically. In the following description, it is assumed that the LED 18A and the LED 18B are located on a line in which the x-coordinate axis is shifted in parallel in the z-direction for convenience of description.

Further, although the LED 18A and the LED 18B that emit infrared rays are described as one example of an electromagnetic wave emission unit that emits electromagnetic waves in this embodiment, the electromagnetic wave emission unit is not limited to the LED 18A and the LED 18B that emit infrared rays. For example, the electromagnetic wave emission unit may be units that, emit X-rays, ultraviolet rays, visible rays with a wavelength of about 400 nm to 700 nm, millimeter waves, microwaves and so on. Furthermore, although the capital letter is affixed to the symbol in order to distinguish between the LED 18A and the LED 18B in FIG. 1, they are collectively referred to simply as the LED 18 if there is no particular need to distinguish between the LED 18A and the LED 18B.

The imaging unit 12 captures the image of a projection plane 8 of infrared rays emitted from the LED 18 successively for a plurality of frames. The IR transmission filter 14 that transmits infrared rays is attached to the imaging unit 12, and the imaging unit 12 captures the image of the projection plane 8 through the IR transmission filter 14. Thus, the degree of exposure to infrared rays on the projection plane 8 is reflected on the frame images obtained by the imaging unit 12.

Further, the imaging unit 12 transmits the captured frame images to the PC 20 by a given communication method. The communication technology for transmitting the frame images may be a wireless communication technology specified by IEEE (Institute of Electrical and Electronic Engineers) 802.11a, b, g and so on. Alternatively, the communication technology may be MIMO (Multi-Input Multi-Output) communication technology specified by IEEE 802.11n or the communication technology specified by IEEE 802.3. An imaging range R shown in FIG. 1 corresponds to the range on the projection plane 8 where the imaging unit 12 can perform imaging. In this embodiment, it is assumed that the center point of the imaging range R is the origin O of the coordinate system for the convenience of description.

The light emission control unit 16 functions as a control unit that controls light emission of the LED 18A and the LED 18B. The light emission control unit 16 receives a synchronizing signal generated by the imaging unit 12 and controls light emission of the LED 18A and the LED 18B based on the synchronizing signal, as described in detail later in "(1-3) Light emission control by the light emission control unit". FIG. 1 shows the case where the hand of an operator exists between the LED 18 and the projection plane 8, and a projected image 30A of the hand of the operator is formed on the projection plane 8 when the LED 18 emits light based on control by the light emission control unit 16.

The curved portion 11A and the curved portion 11B support the rail portion 11C. The image transmission unit 10 changes the curvature of the curved portion 11A and the curved portion 11B according to the manipulation of the up button 19A or the down button 19B.

For example, if the up button 19A is pressed, the image transmission unit 10 decreases the curvature of the curved portion 11A and the curved portion 11B to move the rail portion 11C upward in the z-direction. When the rail portion 11C is moved up, the height of the LED 18A and the LED 18B from the projection plane 8 increases accordingly. On the other hand, if the down button 19B is pressed, the image transmission unit 10 increases the curvature of the curved portion 11A and the curved portion 11B to move the rail portion 11C downward in the z-direction. When the rail portion 11C is moved down, the height of the LED 18A and the LED 18B from the projection plane 8 decreases accordingly.

Further, if the separate button 19C is pressed, the image transmission unit 10 moves the LED 18A and the LED 18B in the direction to separate from each other. Specifically, the image transmission unit 10 moves the LED 18A in the negative x-direction along the rail groove and moves the LED 18B in the positive x-direction along the rail groove. On the other hand, if the close button 19D is pressed, the image transmission unit 10 moves the LED 18A and the LED 18B in the direction to come closer to each other. Specifically, the image transmission unit 10 moves the LED 18A in the positive x-direction along the rail groove and moves the LED 18B in the negative x-direction along the rail groove.

The operator can move the LED 18A and the LED 18B by manipulating the buttons 19A to 19D in this manner. When the LED 18A and the LED 18 are moved, the system characteristics such as the position of a projected image, the position detectable range in the position detection system 1 and the sensitivity to motion change accordingly. The operator can thereby adjust the system characteristics by manipulating the buttons 19A to 19D.

The image transmission unit 10 may detect the positions of the LED 18A, the LED 18B and the imaging unit 12 and transmit them to the PC 20. As a result, the PC 20 can acquire the positions of the LED 18A, the LED 18B and the imaging unit 12 without performing calibration.

The PC 20 receives the image transmitted from the imaging unit 12 and detects the spatial position of an operator body that exists between the LED 18 and the projection plane 8 based on the received image. The PC 20 can detect the position of the projected image of the operator body on the received image and then detect the spatial position of the operator body from the positional relationship between the position of the projected image and the LED 18, as described in detail later in "(1-4) Detection of a projected image from a frame image" and "(1-5) Spatial position detection".

The operator body is assumed to be an object that has a light blocking effect, even if only slightly, to the light emitted from the LED 18. For example, in the embodiment where the LED 18 emits infrared rays, objects such as a human body like a hand and a finger, a stick, a cellular phone and writing utensils can be the operator body. In the dominant conception, the operator body can be expressed as being an object that has a light blocking effect, even if only slightly, to the wavelength component of an electromagnetic wave emitted from the electromagnetic wave emission unit.

FIG. 1 shows the PC 20 as one example of the position detection unit by way of illustration only, and the position detection unit may be a given information processing unit. The information processing unit may be a home video processing unit (e.g. a DVD recorder, a videocassette recorder etc.), a cellular phone, a PHS (Personal Handyphone System), a portable sound playback unit, a portable video processing unit, a PDA (Personal Digital Assistants), a home game device, a portable game device, an electrical household appliance, and so on for example.

Further, although FIG. 1 shows the example where the LED 18A, the LED 18B and the imaging unit 12 are integrally formed on the image transmission unit 10, the embodiment is not limited to such an example. For example, the LED 18A, the LED 18B and the imaging unit 12 may be formed separately from one another. In this case, the position detection system 1 may detect the positional relationship of the LED 18A, the LED 18B, the imaging unit 12 and the projection plane 8 automatically or based on an operation by an operator at the time of starting an operation.

(1-3) Light Emission Control by the Light Emission Control Unit

The position detection system 1 according to the embodiment is schematically described above. The light emission control by the light emission control unit 16 is described hereinafter with reference to FIGS. 2 to 4.

Figure 2:
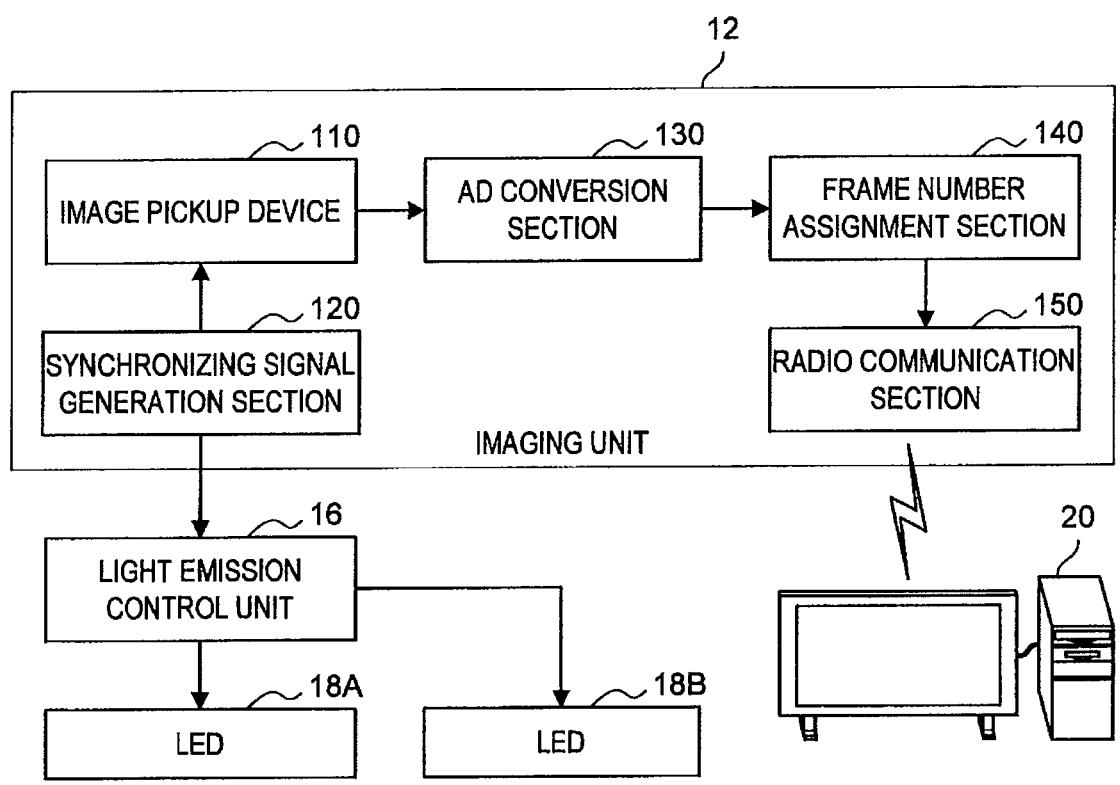
FIG. 2 is an explanatory view showing the configuration of an imaging unit and the relationship among units.

FIG. 2 is an explanatory view showing the configuration of the imaging unit 12 and the relationship among units. Referring to FIG. 2, the imaging unit 12 includes an image pickup device 110, a synchronizing signal generation section 120, an AD (Analog/Digital) conversion section 130, a frame number assignment section 140 and a radio communication section 150.

The image pickup device 110 is a photoelectric conversion section that converts incident light into an electric signal and outputs it. For example, the image pickup device 110 may include photodiodes and CCD (Charge Coupled Devices) that are arranged two-dimensionally corresponding to pixels. In this structure, when the photodiodes are exposed to light, the photodiodes accumulate charges, and the charges accumulated in the photodiodes are sequentially transferred by the CCD.

The image pickup device 110 performs the imaging process from the exposure of the photodiodes to the transfer of charges in synchronization with the rising edge or the falling edge of the synchronizing signal generated by the synchronizing signal generation section 120. For example, the image pickup device 110 may expose the photodiodes to light in synchronization with the rising edge of the synchronizing signal. The charges transferred from the CCD in one exposure correspond to the image of one frame.

The synchronizing signal generation section 120 generates the synchronizing signal to be used when the image pickup device 110 captures images. For example, the synchronizing signal generation section 120 may generate the synchronizing signal in which the number of rising edges is 60 times per second or 180 times per second. If the synchronizing signal generation section 120 generates the synchronizing signal in which the number of rising edges is 180 times per second, the image pickup device 110 captures images at 180 frames per second in synchronization with the rising edge of the synchronizing signal.

The AD conversion section 130 converts the amount of charges transferred from the image pickup device 110 for each pixel into digital format. The AD conversion section 130 then outputs the amount of charges for each pixel in digital format as frame images.

The frame number assignment section 140 assigns a frame number to each frame image supplied from the AD conversion section 130. For example, the frame number assignment section 140 may assign frame numbers sequentially from "0". Further, the frame number assignment section 140 may put a frame number on the header portion of each frame image.

The radio communication section 150 transmits the frame image to which the frame number has been assigned by the frame number assignment section 140 wirelessly to the PC 20. Although the case where the radio communication section 150 transmits the frame image by wireless communication is described in FIGS. 1 and 2, the imaging unit 12 may transmit the frame image by wired communication.

In this manner, it is common that the synchronizing signal generated by the synchronizing signal generation section 120 is used for the imaging process by the image pickup device 110. However, this embodiment is different from the common case in that the synchronizing signal generated by the synchronizing signal generation section 120 is used also by the light emission control unit 16.

The light emission control unit 16 receives the synchronizing signal generated by the synchronizing signal generation section 120 and controls light emission of the LED 18A and the LED 18B in synchronization with the synchronizing signal. For example, the light emission control unit 16 may switch among light emission by the LED 18A, light emission by the LED 18B and no light emission by the LED 18A and the LED 18B at the rising edge of the synchronizing signal. A specific example of the light emission control by the light emission control unit 16 is described hereinafter with reference to FIG. 3.

Figure 3:
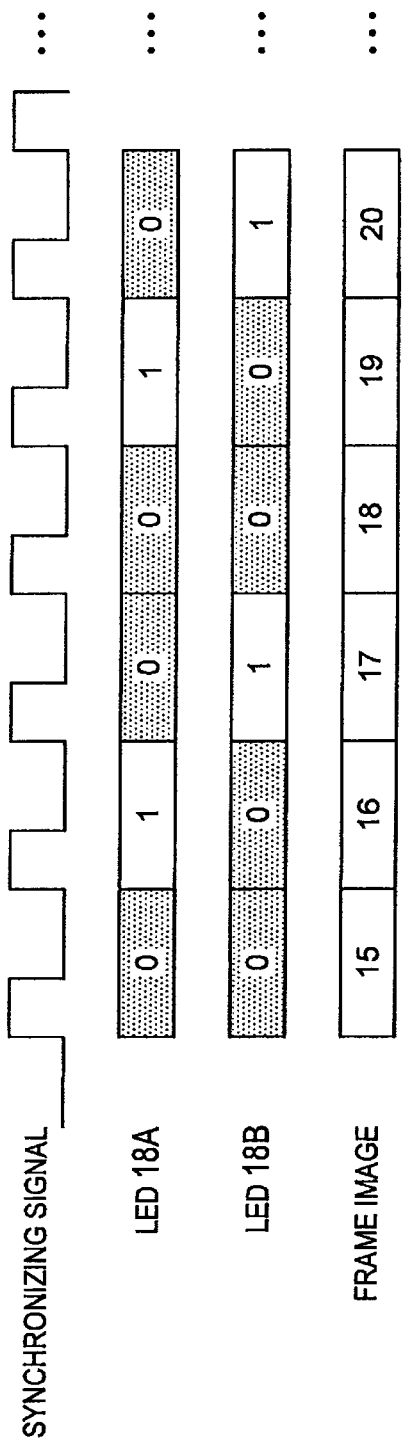
FIG. 3 is an explanatory view showing a specific example of light emission control of LEDs by a light emission control unit.

FIG. 3 is an explanatory view showing a specific example of the light emission control of the LED 18A and the LED 18B by the light emission control unit 16. Specifically, FIG. 3 shows the relationship of the exemplary waveform of the synchronizing signal generated by the synchronizing signal generation section 120, the light emission state of the LED 18A, the light emission state of the LED 18B and the frame image. In FIG. 3, "0" indicates no light emission and "1" indicates light emission.

In the example shown in FIG. 3, the light emission control unit 16 periodically repeats no light emission by the LED 18A and the LED 18B, light emission by the LED 18A only and light emission by the LED 18B only at each rising edge of the synchronizing signal. Because the synchronizing signal is used also for the capture of the frame image by the imaging unit 12, the timing to switch light emission of the LED 18A and the LED 18B is synchronized with the timing to capture the frame image. Thus, each time the imaging unit 12 captures each frame image, the light emission state of the LED 18A and the LED 18B is switched.

Consequently, the frame images are sequentially captured by the imaging unit 12 during no light emission by the LED 18A and the LED 18B, during light emission by the LED 18A only and during light emission by the LED 18B only. For example, as shown in FIG. 3, the frame image (15) is captured during no light emission by the LED 18A and the LED 18B, the frame image (16) is captured during light emission by the LED 18A only, and the frame image (17) is captured during light emission by the LED 18B only.

FIG. 4 is an explanatory view showing specific examples of frame images for each light emission state of the LED 18A and the LED 18B. Specifically, the upper part of FIG. 4 shows the frame image during no light emission by the LED 18A and the LED 18B, the middle part of FIG. 4 shows the frame image during light emission by the LED 18A only, and the lower part of FIG. 4 shows the frame image during light emission by the LED 18B only.

Referring to the upper part of FIG. 4, during no light emission by the LED 18A and the LED 18B, because infrared rays do not reach the projection plane 8, and the IR transmission filter 14 is attached to the imaging unit 12, the brightness of the whole area of the imaging range R by the imaging unit 12 is low.

Referring then to the middle part of FIG. 4, during light emission by the LED 18A, infrared rays reach the projection plane 8, and thereby the brightness of the imaging range R by the imaging unit 12 is entirely high. However, the projected image 30A of the hand of an operator is formed on the projection plane 8, and the brightness of the formation range of the projected image 30A is low. In the middle part of FIG. 4, the coordinates at the tip of the forefinger of the operator in the projected image 30A are indicated by SA for the sake of the description provided later.

Referring further to the lower part of FIG. 4, during light emission by the LED 18B, infrared rays reach the projection plane 8, and thereby the brightness of the imaging range R by the imaging unit 12 is entirely high. However, the projected image 30B of the hand of an operator is formed on the projection plane 8, and the brightness of the formation range of the projected image 30A is low. In the lower part of FIG. 4, the coordinates at the tip of the forefinger of the operator in the projected image 30B are indicated by SB for the sake of the description provided later.

In this manner, the frame image differs depending on the light emission state of the LED 18A and the LED 18B. In this embodiment, the spatial position of the forefinger of the operator can be detected based on a difference in frame image in each light emission state, as described in detail later in "(1-4) Detection of a projected image from a frame image" and "(1-5) Spatial position detection".

Although the example where no light emission by the LED 18A and the LED 18B, light emission by the LED 18A only and light emission by the LED 18B only are sequentially repeated is shown in FIG. 3, this embodiment is not limited to such an example. For example, the light emission control unit 16 may repeat light emission by the LED 18A only and light emission by the LED 18B only a plurality of times for one time of no light emission by the LED 18A and the LED 18B.

(1-4) Detection of a Projected Image from a Frame Image

The detection of the projected image from the frame image captured by the imaging unit 12 is described hereinafter with reference to FIG. 5

Figure 5:
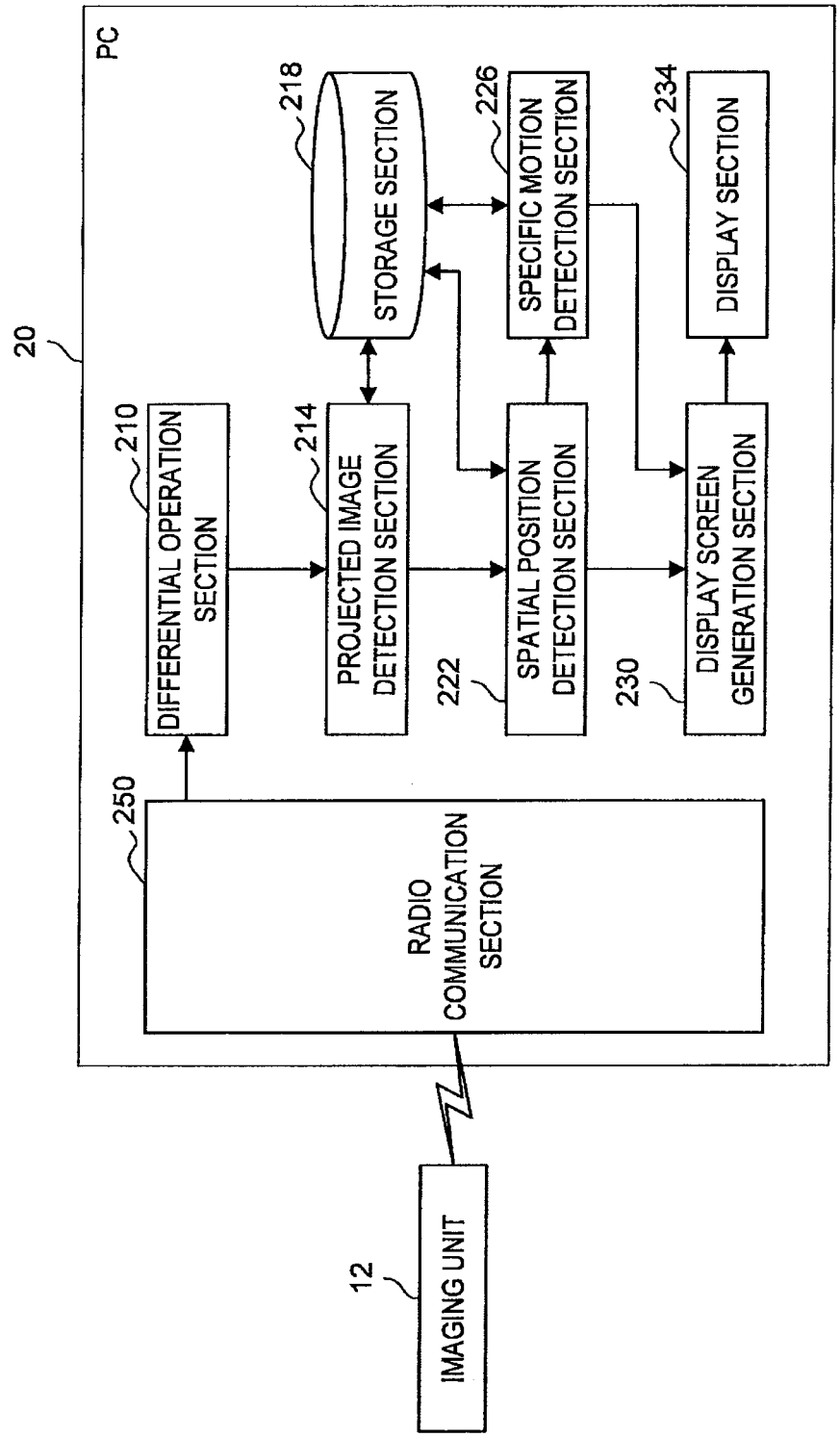
FIG. 5 is a functional block diagram showing the configuration of a PC that functions as a position detection unit.

FIG. 5 is a functional block diagram showing the configuration of the PC 20 that functions as the position detection unit. Referring to FIG. 5, the PC 20 according to the embodiment includes a differential operation section 210, a projected image detection section 214, a storage section 218, a spatial position detection section 222, a specific motion detection section 226, a display screen generation section 230, a display section 234, and a radio communication section 250.

The radio communication section 250 is an interface with the imaging unit 12 and receives the frame image transmitted from the imaging unit 12. The radio communication section 250 may further receive the positions of the LED 18A, the LED 18B and the imaging unit 12 and so on from the image transmission unit 10.

The differential operation section 210 calculates a difference between the frame image captured during no light emission by the LED 18A and the LED 18B and the frame image captured during light emission by the LED 18A or during light emission by the LED 18B. For this operation, the differential operation section 210 first determines the light emission state of the LED 18A and the LED 18B when each of the frame images received by the radio communication section 250 is captured.

For example, the differential operation section 210 may determine the light emission state corresponding to each frame image based on the frame number assigned to each frame image. Specifically, the differential operation section 210 may divide the frame number by 3, and it may determine that the frame image is captured during light emission by the LED 18A if the reminder is 1, that the frame image is captured during light emission by the LED 18B if the reminder is 2, and that the frame image is captured during no light emission by the LED 18A and the LED 18B if the reminder is 0.

Alternatively, the differential operation section 210 may determine the light emission state corresponding to each frame image based on the overall brightness of each frame image. For example, the differential operation section 210 may compare the brightness of at least three successive frame images and determine that the frame image with the lowest brightness is captured during no light emission by the LED 18A and the LED 18B. Then, the differential operation section 210 may determine that the next frame image is captured during light emission by the LED 18A and further that the subsequent frame image is captured during light emission by the LED 18B on the basis of the frame image determined to be the one captured during no light emission.

After determining the light emission state at the time of capturing each frame image, the differential operation section 210 calculates a difference between the frame image captured during no light emission by the LED 18A and the LED 18B and the frame image captured during light emission by the LED 18A or during light emission by the LED 18B.

The frame image captured during no light emission by the LED 18A and the LED 18B is the image of the projection plane 8 when receiving ambient natural light. On the other hand, the frame image captured during light emission by the LED 18A is the image of the projection plane 8 when receiving infrared rays emitted from the LED 18A, in addition to the ambient natural light, in the area different from the formation range of the projected image 30A of the hand of the operator. Thus, as a result that the differential operation section 210 calculates a difference between the frame image captured during no light emission by the LED 18A and the LED 18B and the frame image captured during light emission by the LED 18A, the formation range of the projected image 30A of the hand of the operator is extracted.

Likewise, the frame image captured during light emission by the LED 18B is the image of the projection plane 8 when receiving infrared rays emitted from the LED 18B, in addition to the ambient natural light, in the area different from the formation range of the projected image 30A of the hand of the operator. Thus, as a result that the differential operation section 210 calculates a difference between the frame image captured during no light emission by the LED 18A and the LED 18B and the frame image captured during light emission by the LED 18B, the formation range of the projected image 30B of the hand of the operator is extracted.

Further, the differential operation section 210 may calculate a difference between the frame image captured during light emission by the LED 18A and the frame image captured during no light emission at the capture time closest to that of the above frame image or in the same cycle. For example, the differential operation section 210 may calculate a difference between the frame image (15) and the frame image (16) in FIG. 3. It is thereby possible to detect the projected image 30A more accurately even when the ambient lighting conditions and the background image are varying. Likewise, the differential operation section 210 may calculate a difference between the frame image (15) and the frame image (17) in FIG. 3.

The projected image detection section 214 detects a specific portion from the projected image 30 formed on each frame image based on a result of calculation by the differential operation section 210. For example, the projected image detection section 214 detects the position of the tip SA of the forefinger in the projected image 30A and the position of the tip SB of the forefinger in the projected image 30B shown in FIG. 4.

Specifically, the projected image detection section 214 may perform pattern matching between the shape pattern of a forefinger prestored in the storage section 218 and each frame image (after differential operation) and thereby detect the position of the tip S of the forefinger in the projected image 30.

Alternatively, the projected image detection section 214 may detect the position at which a prescribed coordinate value is highest within the formation range of the projected image 30 as the position of the tip S of the forefinger. For example, in the example shown in FIG. 4, the projected image detection section 214 detects the position at which the value of y is largest within the formation range of the projected image 30, thereby accurately detecting the position of the tip SA of the forefinger in the projected image 30A and the position of the tip SB of the forefinger in the projected image 30B.

(1-5) Spatial Position Detection

The detection of the spatial position of the tip of a forefinger is described hereinafter with reference to FIG. 6.

Figure 6:
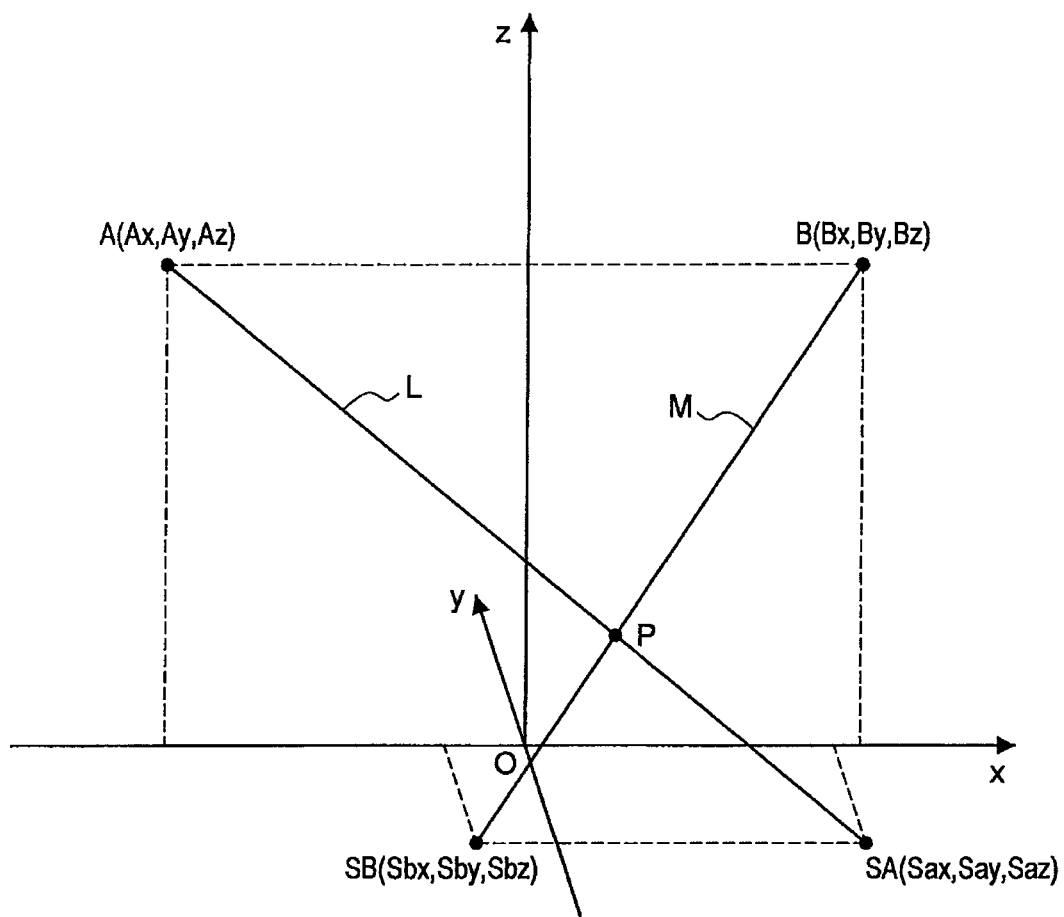
FIG. 6 is an explanatory view showing the relationship of the spatial position of the tip of a forefinger, the position of a projected image and the positions of LEDs.

FIG. 6 is an explanatory view showing the relationship of the spatial position of the tip of the forefinger, the position of the projected image 30 and the positions of the LEDs 18. In FIG. 6, the coordinates of the LED 18A are indicated by A(Ax, Ay, Az), the coordinates of the LED 18B are indicated by B(Bx, By, Bz), and the spatial position of the tip of the forefinger is indicated by P (which is referred to as the spatial forefinger position P).

Referring to FIG. 6, in consideration of rectilinear propagation of light, the spatial forefinger position P is assumed to exist on a straight line L connecting the coordinates A of the LED 18A and the coordinates SA. Likewise, the tip of the forefinger is assumed to exist on a straight line M connecting the coordinates B of the LED 18B and the coordinates SB.

The spatial position detection section 222 detects the intersection of the line L and the line M as the spatial forefinger position P based on the assumption that the spatial forefinger position P exists on the line L and the line M. Thus, the spatial position detection section 222 (estimation section) may estimate the line L and the line M, project the line L and the line M on any plane, and calculate the intersection point of the line L and the line M projected on the plane.

For example, the spatial position detection section 222 may project the line L and the line M on the x-y plane, calculate the intersection point of the line L and the line M projected on the x-y plane, and detect, the x and y coordinates at the intersection point, and the x-coordinates of the line L or the line M at the x and y coordinates at the intersection point as the spatial position P. In this configuration, because it is expected that the line L and the line M projected on the x-y plane intersect even when the line L and the line M do not actually intersect, the position (intersection) at which the line L and the line M are in proximity can be detected as the spatial position P. The spatial position detection section 222 may detect the spatial forefinger position P by projecting the line L and the line M on the y-z plane or the x-z plane.

Alternatively, the spatial position detection section 222 may represent the line L and the line M using a vector, and it may calculate the position (intersection) on the line L in most proximity to the line M by vector operation and detect the calculated position as the spatial forefinger position P. Further, the spatial position detection section 222 may calculate the positions on the line L and the line M in most proximity to each other and detect a point, e.g. a mid point, between the calculated positions as the spatial forefinger position P.

After the spatial forefinger position P is detected by the spatial position detection section 222, the display screen generation section 230 generates a display screen according to the spatial forefinger position P. For example, in the case of generating a three-dimensional image, the display screen generation section 230 may superimpose a cursor on the position corresponding to the spatial forefinger position P in the three-dimensional image. Further, in the case of generating an image of a three-dimensional game space, the display screen generation section 230 may move the character three dimensionally according to a change in the spatial forefinger position P in the game space.

The display section 234 displays the display screen generated by the display screen generation section 230. For example, the display section 234 may be a video output device such as a CRT (cathode ray tube) display device, an LCD (liquid crystal display) device and an OLED (organic light emitting display) device.

The specific motion detection section 226 detects a specific motion of the forefinger by matching a change in the spatial forefinger position P detected by the spatial position detection section 222 with the movement patterns of specific motions prerecorded in the storage section 218. For example, the storage section 218 may store the movement pattern that the forefinger moves in a circular motion, the movement pattern that the forefinger is thrown forward, the movement pattern that the forefinger is bent and so on as the movement patterns of specific motions. Although the case where the spatial position P of the forefinger is detected is described above, the spatial position of a thumb, in addition to the forefinger, may be detected in the same manner. In this case, the storage section 218 stores the movement pattern that the forefinger and the thumb are thrown out, the movement pattern that the forefinger and the thumb move as being thrown out, the movement pattern that the forefinger and the thumb rotate and so on as the movement patterns of specific motions.

The storage section 218 may be nonvolatile memory such as EEPROM (Electrically Erasable Programmable Read-Only Memory) and EPROM (Erasable Programmable Read-Only Memory), magnetic disks such as a hard disk and a discoid magnetic disk, optical discs such as CD-R (Compact Disc Recordable)/RW (Rewritable), DVD-R (Digital Versatile Disc Recordable)/RW/+R/+RW/RAM(Random Access Memory) and BD (Blu-ray Disc (registered trademark))-R/BD-RE, or a storage medium such as MO (Magneto Optical) disk.

When a specific motion is detected by the specific motion detection section 226, the display screen generation section 230 performs processing or generation of a display screen according to the detected specific motion. For example, if the movement pattern that the forefinger is thrown forward is detected, the display screen generation section 230 may enlarge the generated screen. Further, if the movement pattern that the forefinger moves in a circular motion is detected, the display screen generation section 230 may recognize it as a click operation and generate a display screen showing the detail of the item pointed by the cursor.

(1-6) A Series of Operations by the Position Detection System

The functions of the position detection system 1 according to the embodiment are described in the foregoing. A series of operations by the position detection system 1 according to the embodiment are described hereinafter with reference to FIG. 7.

Figure 7:
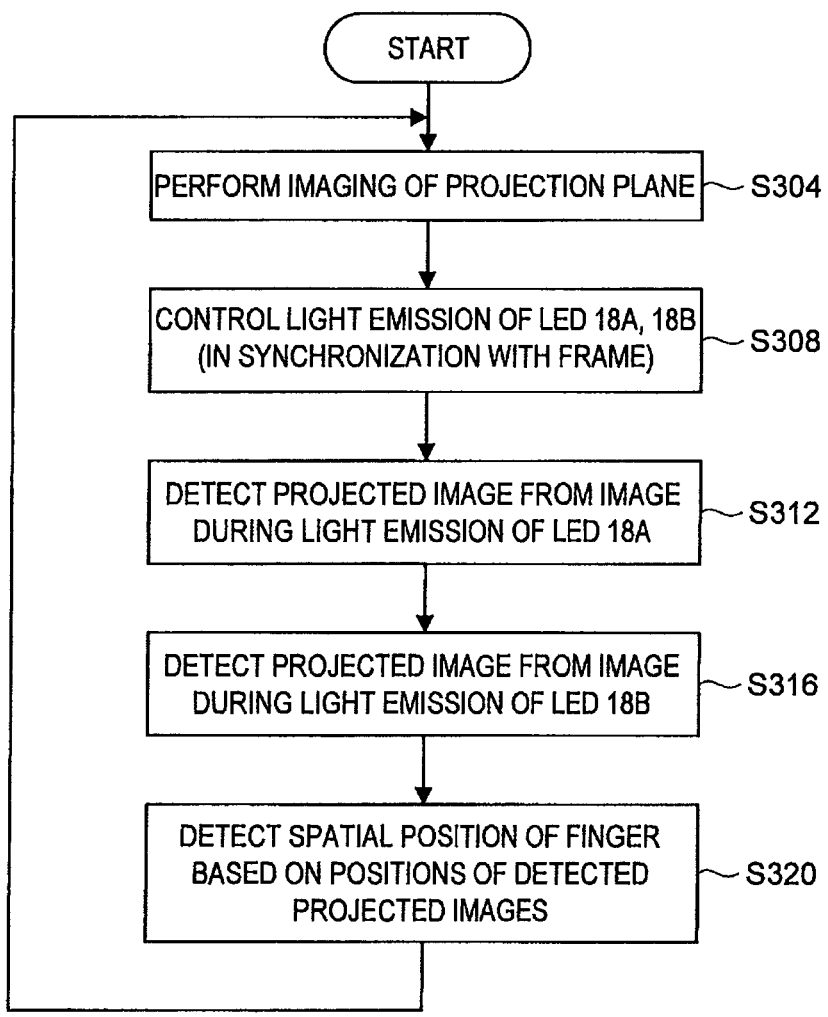
FIG. 7 is a flowchart showing the process flow of a position detection method performed in the position detection system according to the first embodiment.

FIG. 7 is a flowchart showing the process flow of a position detection method performed in the position detection system 1 according to the first embodiment. Referring to FIG. 7, the imaging unit 12 starts the imaging of the projection plane 8 firstly (S304). The imaging unit 12 captures the image of the projection plane 8 in synchronization with the synchronizing signal generated by the synchronizing signal generation section 120.

Further, the light emission control unit 16 controls light emission of the LED 18A and the LED 18B in synchronization with the synchronizing signal generated by the synchronizing signal generation section 120 (S308). For example, the light emission control unit 16 switches among no light emission by the LED 18A and the LED 18B, light emission by the LED 18A only and light emission by the LED 18B only sequentially in synchronization with the synchronizing signal generated by the synchronizing signal generation section 120.

Then, the differential operation section 210 and the projected image detection section 214 of the PC 20 detect the projected image 30A based on a difference between the frame image during no light emission by the LED 18A and the LED 18B and the frame image during light emission by the LED 18A only (S312). Likewise, the differential operation section 210 and the projected image detection section 214 detect the projected image 30B based on a difference between the frame image during no light emission by the LED 18A and the LED 18B and the frame image during light emission by the LED 18B only (S316).

After that, the spatial position detection section 222 detects the spatial forefinger position P, for example, from the formation positions of the detected projected images 30 by the method described in "(1-5) Spatial position detection" (S320). The position detection system 1 then repeats the process from S304 to S320, thereby defecting the spatial forefinger positions P in succession and detecting the spatial motion of the forefinger.

(1-7) Summary of the First Embodiment

As described in the foregoing, the position detection system 1 according to the first embodiment of the present invention captures the projected image of an operator body, not the actual operator body. Because the projected image has a higher contrast from a background image than the actual operator body, the position detection system 1 can detect the projected image of the operator body from the frame image more accurately.

Further, the position detection system 1 according to the first embodiment of the present invention controls light emission of the LED 18A and the LED 18B in synchronization with the timing to capture the frame image. Then, the position detection system 1 according to the first embodiment of the present invention calculates a difference between the frame image captured during light emission by the LED 18A and the frame image captured during no light emission at the capture time closest to that of the above frame image or in the same cycle. Likewise, the position detection system 1 according to the first embodiment of the present invention calculates a difference between the frame image captured during light emission by the LED 18B and the frame image captured during no light emission at the capture time closest to that of the above frame image or in the same cycle. In this configuration, it is possible to continuously detect the projected images 30A and 30B accurately even when the ambient lighting conditions and the background image are varying.

Furthermore, the position detection system 1 according to the first embodiment, of the present invention can detect the spatial position of an operator body based on the arrangement positions of the LED 18A and the LED 18B and the formation positions of the projected images 30A and 30B. For example, when the synchronizing signal in which the number of rising edges is 180 times per second is generated by the synchronizing signal generation section 120, the position detection system 1 according to the first embodiment of the present invention can detect the spatial position of an operator body 60 times per second. Further, the position detection system 1 according to the first embodiment of the present invention can detect the motion of an operator body by continuously detecting the spatial position of the operator body.

(1-8) Supplementary Explanation to the First Embodiment

The first embodiment of the present invention described above may be altered as appropriate. An alternative example 1 and an alternative example 2 of the first embodiment of the present invention are described hereinbelow.

(Alternative Example 1)

Although the case where the position detection system 1 includes a plurality of LEDs 18, i.e. the LED 18A and the LED 18B, to detect the spatial position of an operator body is described in the first embodiment, the number of LEDs 18 included in the position detection system 1 is not limited to two. For example, the position detection system 1 may include three or more LEDs 18. Further, in the case where the LED 18 is mounted on the ceiling of a room or the like, it is not necessary to mount the LED 18 additionally as a component of the position detection system 1.

Further, the number of LED 18 included in the position detection system 1 may be one. In this case, the light emission control unit 16 switches between light emission and no light emission by the LED 18 in synchronization with the synchronizing signal generated by the synchronizing signal generation section 120. Then, the differential operation section 210 of the PC 20 calculates a difference between the frame image during light emission by the LED 18 and the frame image during no light emission by the LED 18, and the projected image detection section 214 detects the projected image of an operator body based on the calculation result.

After that, the spatial position detection section 222 detects the spatial position or the two-dimensional position of the operator body from the projected image detected by the projected image detection section 214. Although it seems difficult to detect the spatial position of an operator body from a single projected image, the spatial position detection section 222 can detect the spatial position of the operator body based on a change in the size of the projected image in addition to the formation position of the projected image.

In this configuration, the number of times to detect the spatial position of an operator body per second increases compared with the case of using a plurality of LEDs 18. For example, if the synchronizing signal in which the number of rising edges is 180 times per second is generated by the synchronizing signal generation section 120, the spatial position of an operator body can be detected 90 times per second.

(Alternative Example 2)

Further, although the case where the imaging unit 12 captures the image of the projection plane 8 from the side where the LED 18 is placed is described in the first embodiment, the imaging unit 12 may capture the image of the projection plane 8 from the side opposite from the side where the LED 18 is placed.

Figure 8:
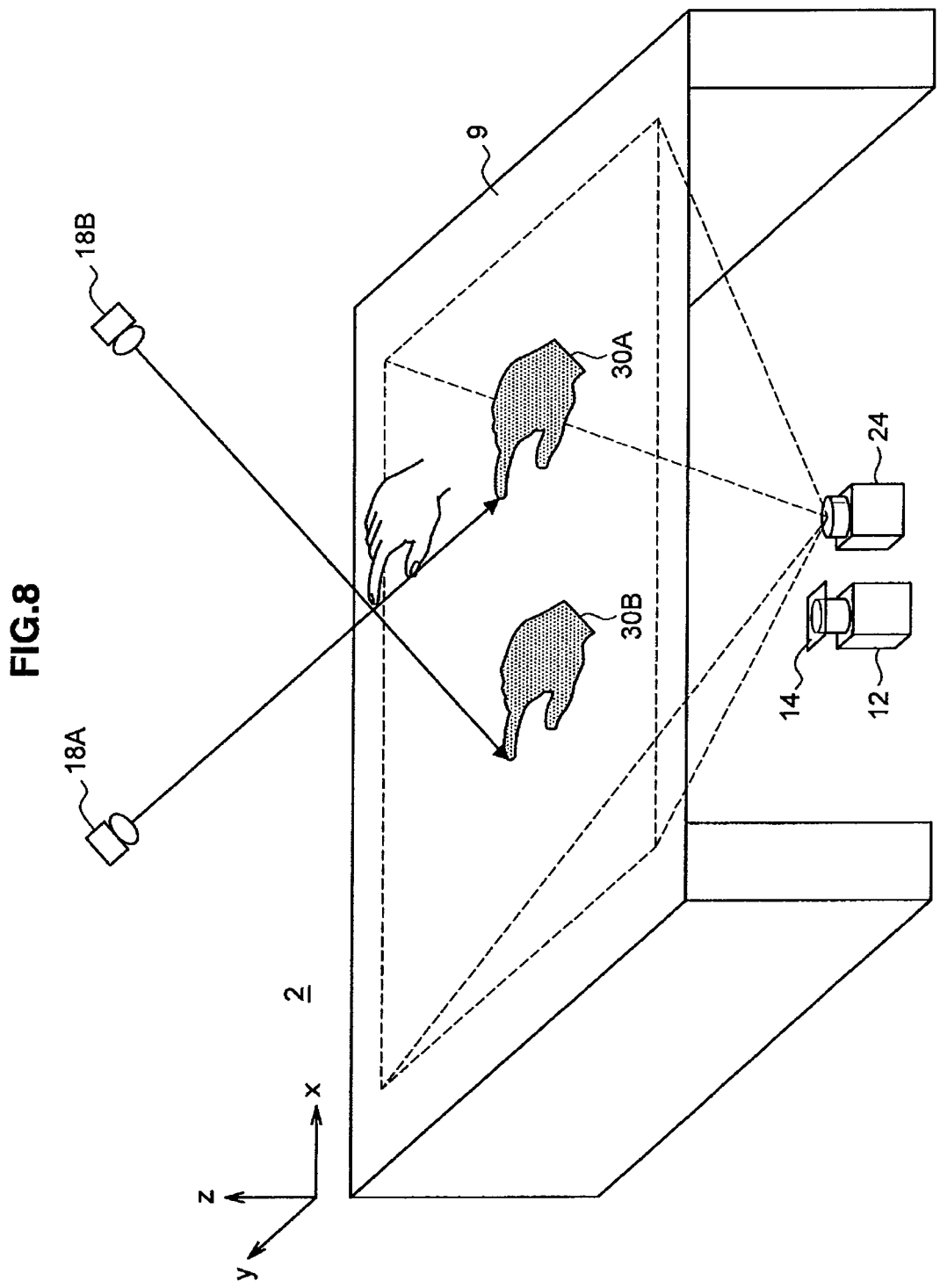
FIG. 8 is an explanatory view showing the configuration of a position detection system according to an alternative example of the first embodiment.

FIG. 8 is an explanatory view showing the configuration of a position detection system 2 according to an alternative example of the first embodiment. Referring to FIG. 8, the position detection system 2 according to this alternative example includes a screen 9, a LED 18A, a LED 18B, an imaging unit 12, an IR transmission filter 14 and a projector 24.

The screen 9 has the characteristics that transmit at least part of infrared rays emitted from the LED 18A and the LED 18B to the backside. Thus, the imaging unit 12 can capture the images of the projected images 30A and 30B of the hand of an operator from the backside of the screen 9. Receiving the frame images captured by the imaging unit 12, the position detection unit can detect z-coordinate values in addition to x-coordinate values and y-coordinate values of the hand of the operator.

The LED 18A and the LED 18B are not necessarily controlled to emit light in synchronization with the timing when the imaging unit 12 captures the frame. For example, the LED 18A and the LED 18B may maintain the light emission state. In this case, the position detection unit detects the two projected images 30 from the frame images. The position detection unit can still detect which of the detected projected images is the projected image 30A by the LED 18A and which is the projected image 30B by the LED 18B based on the positional relationship of the LED 18A and the LED 18B.

Specifically, when the LED 18B is placed in the positive x-direction with respect to the LED 18A, the projected image whose formation position is relatively negative in the x-direction to the other can be detected as the projected image 30B by the LED 18B. Likewise, the projected image whose formation position is relatively positive in the x-direction to the other can be detected as the projected image 30A by the LED 18A.

Further, the case of calculating a difference in frame image between light emission and no light emission by the LED 18 in order to deal with a change in lighting conditions or the like is described in the above embodiment. However, in the case of giving higher priority to a detection speed of a spatial position per unit time, the period of no light emission by the LED 18 may be eliminated, and the calculation of a difference in frame image may be omitted.

(2) Second Embodiment

The position detection system 1 according to the first embodiment of the present invention is described in the foregoing. In the following, a second embodiment of the present invention is described with reference to FIGS. 9 to 14 after describing the circumstances of development of the second embodiment.

(2-1) Circumstances of Development of the Second Embodiment

Various interfaces that capture the image of an operator by an imaging unit, extract an operator body from the captured image and detect the motion (gesture) of the extracted operator body as an input operation have been proposed heretofore. The operator body is assumed to be an operator's finger and a stick having a tapered three-dimensional shape and so on.

In order to appropriately detect the input operation of an operator in such interfaces, it is important to efficiently and accurately extract an object having a specific three-dimensional shape such as an operator's finger and a stick from a background image. However, because the captured image is two dimensional, it has been difficult to extract an object having a specific three-dimensional shape from the captured image.

Given such circumstances, a tip detection system 4 according to a second embodiment of the present invention has been invented. The tip detection system 4 according to the second embodiment of the present invention is capable of detecting the tip of an object having a specific three-dimensional shape. The tip detection system 4 according to the embodiment is described hereinbelow.

(2-2) Outline of the Tip Detection System According to the Second Embodiment

Figure 9:
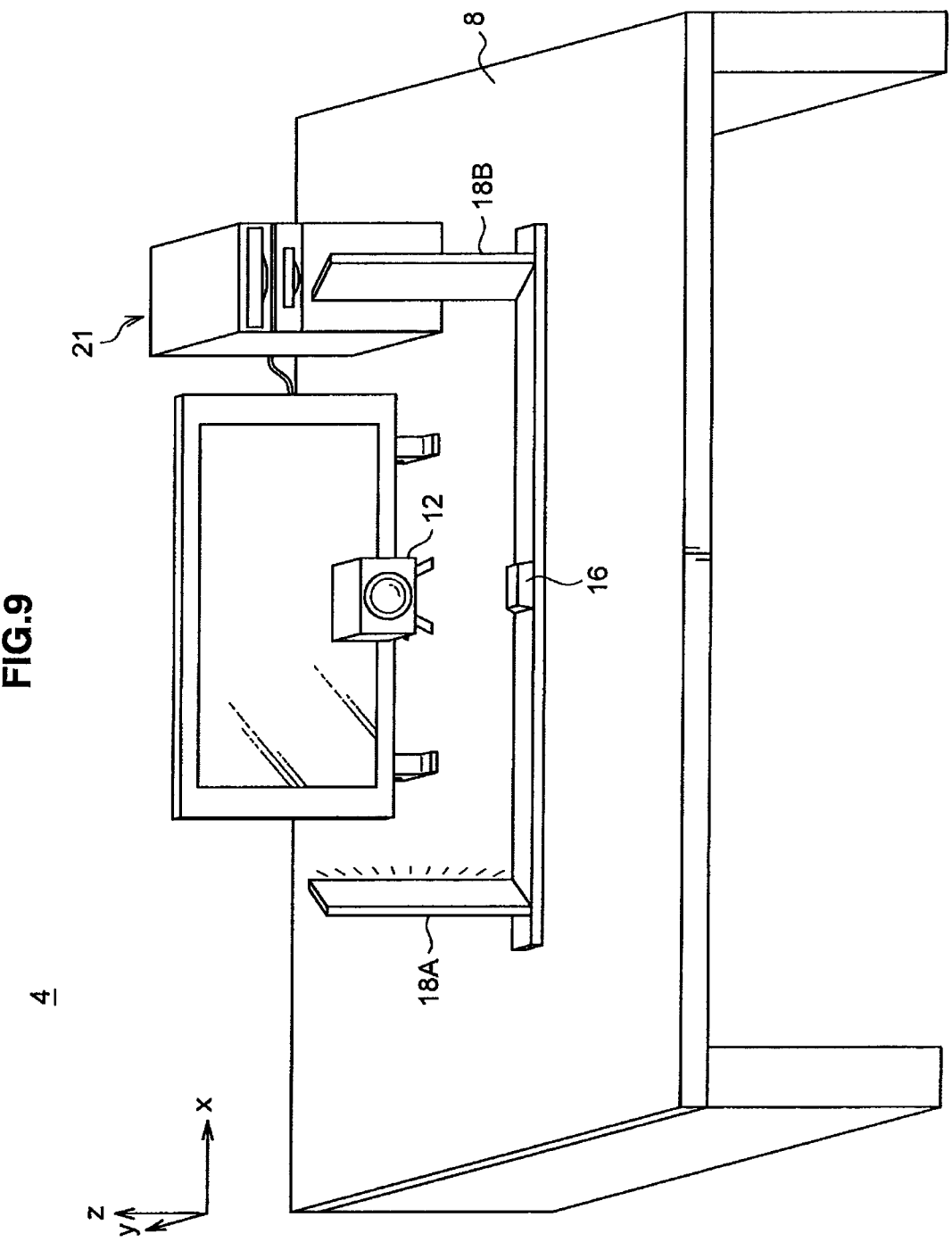
FIG. 9 is an outline view showing the exemplary configuration of a tip detection system according to a second embodiment of the present invention.
Figure 10:
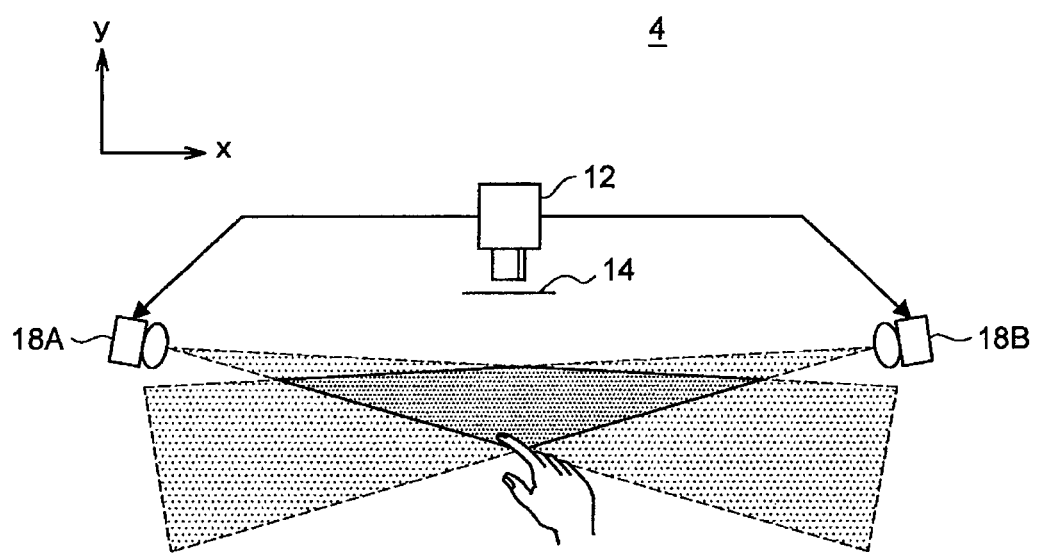
FIG. 10 is an outline view showing the exemplary configuration of the tip detection system according to the second embodiment of the present invention.

FIGS. 9 and 10 are outline views showing the exemplary configuration of the tip detection system 4 according to the second embodiment of the present invention. Referring to FIG. 9, the tip detection system 4 (object determination system) according to the embodiment includes an imaging unit 12, an IR transmission filter 14, a light emission control unit 16, a LED 18A, a LED 18B, and a PC 21. FIG. 10 is a plan view when viewing the tip detection system 4 shown in FIG. 9 from the x-direction.

Referring to FIG. 10, the LED 18A and the LED 18B are arranged in such a way that the directions to emit infrared rays intersect. As a result, the intersection range of infrared rays emitted from the LED 18A and infrared rays emitted from the LED 18B is formed, which is an area surrounded by the full lines in FIG. 10.

The imaging unit 12 is configured in substantially the same manner as the first embodiment. The imaging unit 12 of this embodiment, however, is different from the first embodiment in imaging subject. Specifically, the imaging subject of the imaging unit 12 according to the embodiment is the intersection range of infrared rays emitted from the LED 18A and the LED 18B. Further, the IR transmission filter 14 that transmits infrared rays is attached to the imaging unit 12, and the imaging unit 12 captures the intersection range of infrared rays through the IR transmission filter 14. Thus, an infrared ray receiving portion in the intersection range of infrared rays is shown on the frame image captured by the imaging unit 12. Further, the imaging unit 12 transmits the captured frame image to the PC 20 by a given communication method.

The light emission control unit 16 functions as a control unit that controls light emission of the LED 18A and the LED 18B, as in the first embodiment. Specifically, the light emission control unit 16 receives the synchronizing signal generated by the imaging unit 12 and controls light emission of the LED 18A and the LED 18B based on the synchronizing signal. For example, the light emission control unit 16 may switch among light emission by the LED 18A, light emission by the LED 18B and no light emission by the LED 18A and the LED 18B at the rising edge of the synchronizing signal.

(2-3) Detection of a Tip from a Frame Image

The detection of a tip from a frame image according to the embodiment is described hereinafter with reference to FIGS. 11 to 13.

Figure 11:
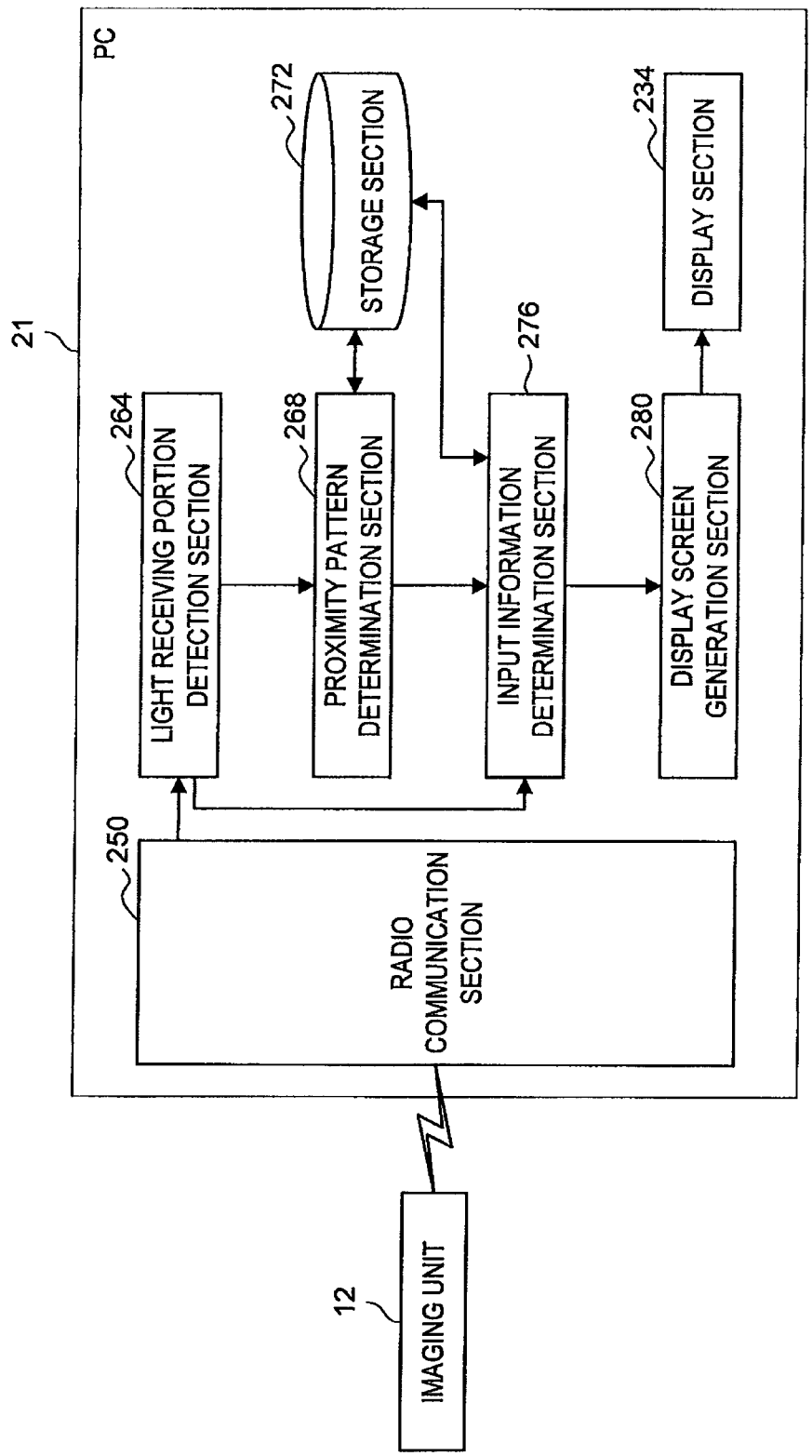
FIG. 11 is a functional block diagram showing the configuration of a PC according to the second embodiment of the present invention.

FIG. 11 is a functional block diagram showing the configuration of the PC 21 according to the second embodiment of the present invention. Referring to FIG. 11, the PC 21 (object determination unit) according to the embodiment includes a display section 234, a radio communication section 250, a light receiving portion detection section 264, a proximity pattern determination section 268, a storage section 272, an input information determination section 276, and a display screen generation section 280. The functions of the radio communication section 250 and the display section 234 are substantially the same as those described in the first embodiment and thus not repeatedly described below.

The light receiving portion detection section 264 detects the light receiving portions that receive infrared rays from the frame image captured during light emission by the LED 18A and the frame image captured during light emission by the LED 18B. The detection of the light receiving portion by the light receiving portion detection section 264 is described hereinafter with reference to FIG. 12.

Figure 12:
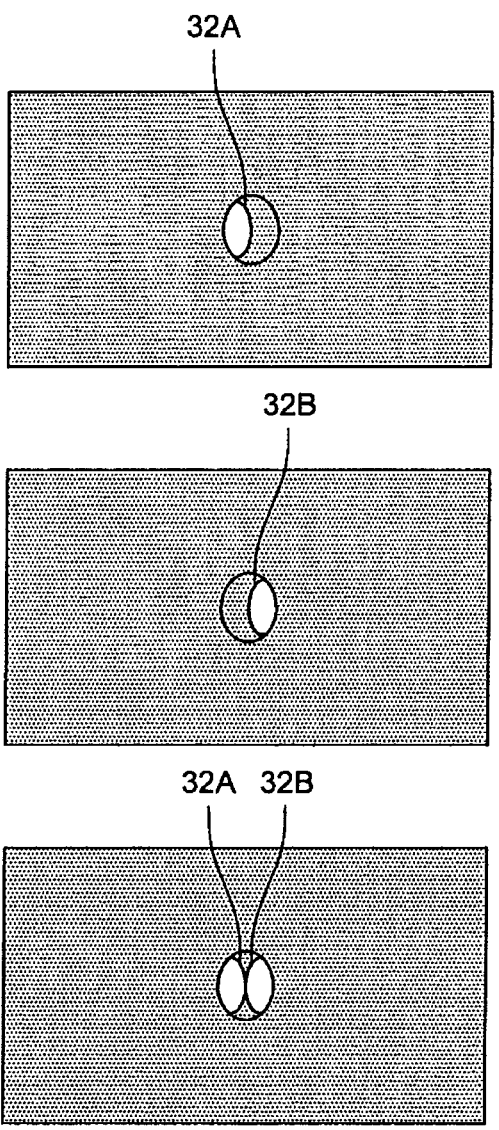
FIG. 12 is an explanatory view showing specific examples of frame images captured in each light emission state.

FIG. 12 is an explanatory view showing specific examples of frame images captured in each light emission state. Specifically, the upper part of FIG. 12 shows the frame image during light emission by the LED 18A only, the middle part of FIG. 12 shows the frame image during light emission by the LED 18B only, and the lower part of FIG. 12 shows the frame image during light emission by both the LED 18A and the LED 18B.

When a forefinger exists in the intersection range of infrared rays as shown in FIG. 10, during light emission by the LED 18A only, the side surface of the forefinger on the LED 18A side receives the infrared rays, and the side surface of the forefinger on the LED 18B side does not receive the infrared rays. Accordingly, the frame image captured during light emission by the LED 18A only contains a light receiving portion 32A corresponding to the side surface of the forefinger on the LED 18A side shown in the upper part of FIG. 12.

On the other hand, during light emission by the LED 18B only, the side surface of the forefinger on the LED 18B side receives the infrared rays, and the side surface of the forefinger on the LED 18A side does not receive the infrared rays. Accordingly, the frame image captured during light emission by the LED 18B only contains a light receiving portion 32B corresponding to the side surface of the forefinger on the LED 18B side shown in the middle part of FIG. 12.

The light receiving portion detection section 264 extracts the light receiving portion 32A and the light receiving portion 32B from such frame images. Specifically, as described in the first embodiment, the light receiving portion detection section 264 detects the light receiving portion 32A based on a difference between the frame image captured during no light emission by the both LEDs 18 and the frame image captured during light emission by the LED 18A only. Likewise, the light receiving portion detection section 264 detects the light receiving portion 32B based on a difference between the frame image captured during no light emission by the both LEDs 18 and the frame image captured during light emission by the LED 18B only.

The proximity pattern determination section 268 functions as a determination section that makes a determination about the physical shape of an object existing in the intersection range of infrared rays according to the degree of proximity between the light receiving portion 32A and the light receiving portion 32B detected by the light receiving portion detection section 264.

For example, when a tapered object such as a forefinger exists in the intersection range of infrared rays, one side surface of the object receives the infrared rays emitted from the LED 18A, and the other side surface of the object receives the infrared rays emitted from the LED 18B. In the tapered object such as a forefinger, one side surface and the other side surface are in proximity. Thus, the proximity pattern determination section 268 determines that a tapered object such as a forefinger and a stick exists in the intersection range of infrared rays when the light receiving portion 32A and the light receiving portion 32B in the frame image are in proximity. The proximity pattern determination section 268 can also detect the number of fingers existing in the intersection range of infrared rays based on the degree of proximity of the light receiving portions.

On the other hand, when a human fist exists in the intersection range of infrared rays, the frame images as shown in FIG. 13 are captured.

FIG. 13 is an explanatory view showing other specific examples of frame images. Specifically, the upper part of FIG. 13 shows the frame image during light emission by the LED 18A only, and the lower part of FIG. 13 shows the frame image during light emission by the LED 18B only.

The shape of the human finger can be recognized to resemble a part of a trapezoid when viewed from above. Specifically, the upper side of the trapezoid corresponds to the base from the forefinger to the little finger, and the oblique lines of the trapezoid correspond to the part from the base of the outer side of the little finger toward the wrist and the part from the base of the outer side of the forefinger toward the thumb.

Thus, when the human fist exists in the intersection range of infrared rays, during light emission by the LED 18A only, the outer side of the forefinger and its vicinity, which is the side surface of the first on the LED 18A side, receives the infrared rays, and the other part receives a smaller amount of infrared rays compared with the side surface on the LED 18A side. Accordingly, the frame image captured during light emission by the LED 18A only contains a light receiving portion 34A corresponding to the side surface of the fist on the LED 18A side shown in the upper part of FIG. 13.

On the other hand, during light emission by the LED 18B only, the outer side of the little finger and its vicinity, which is the side surface of the fist on the LED 18B side, receives the infrared rays, and the other part receives a smaller amount of infrared rays compared with the side surface on the LED 18B side. Accordingly, the frame image captured during light emission by the LED 18B only contains a light receiving portion 34B corresponding to the side surface of the fist on the LED 18B side shown in the lower part of FIG. 13.

If the light receiving portions 34A and 34B are spaced from each other as shown in FIG. 13, the proximity pattern determination section 268 determines that the object existing in the intersection range of infrared rays is a less tapered object such as a human fist.

Further, if the light receiving portion during light emission by the LED 18A only and the light receiving portion during light emission by the LED 18B only match in a large area, the proximity pattern determination section 268 may determine that the object existing in the intersection range of infrared rays is a planar object such as a palm.

The input information determination section 276 makes a determination about the input information from an operator body based on a determination result of the proximity pattern determination section 268 and a combination of the positions or motions of light receiving portions in frame images. Specifically, the storage section 272 may store an object, the positions or motions of light receiving portions in frame images, and input information in association with one another, and the input information determination section 276 may read the input information corresponding to the above combination from the storage section 272. For example, different input information may be associated with the circular motion of a forefinger, the circular motion of a fist and so on in the storage section 272.

The display screen generation section 280 generates a display screen on which the input information by the operator body that is determined by the input information determination section 276 is reflected. The display screen generated by the display screen generation section 280 is displayed on the display section 234, thereby allowing an operator to know whether the input operation has been accepted.

(2-4) A Series of Operations by the Tip Detection System

The tip detection system 4 according to the second embodiment of the present invention is described in the foregoing. A series of operations in the tip detection system 4 according to the second embodiment of the present invention are described hereinafter with reference to FIG. 14.

Figure 14:
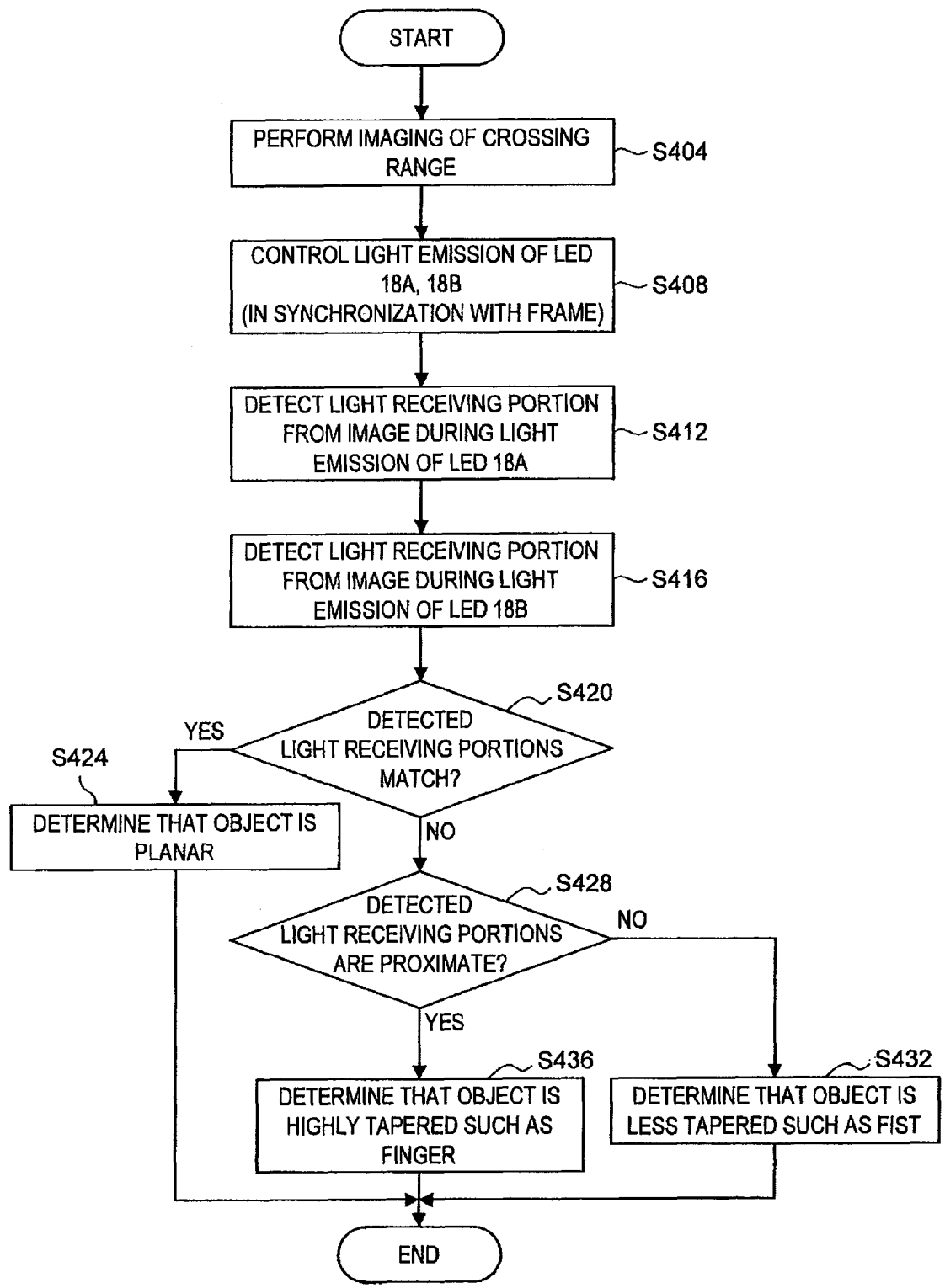
FIG. 14 is a flowchart showing the process flow of an object determination method performed in the tip detection system according to the second embodiment of the present invention.

FIG. 14 is a flowchart showing the process flow of an object determination method performed in the tip detection system 4 according to the second embodiment of the present invention. Referring to FIG. 14, the imaging unit 12 starts the imaging of the intersection range of infrared rays firstly (S404). The imaging unit 12 captures the image of the intersection range of infrared rays in synchronization with the synchronizing signal generated by the synchronizing signal generation section 120.

Further, the light emission control unit 16 controls light emission of the LED 18A and the LED 18B in synchronization with the synchronizing signal generated by the synchronizing signal generation section 120 (S408). For example, the light emission control unit 16 switches among no light emission by the LED 18A and the LED 18B, light emission by the LED 18A only and light emission by the LED 18B only sequentially in synchronization with the synchronizing signal generated by the synchronizing signal generation section 120.

Then, the light receiving portion detection section 264 of the PC 21 detects the light receiving portion in the frame image based on a difference between the frame image during no light emission by the LED 18A and the LED 18B and the frame image during light emission by the LED 18A only (S412). Likewise, the light receiving portion detection section 264 detects the light receiving portion in the frame image based on a difference between the frame image during no light emission by the LED 18A and the LED 18B and the frame image during light emission by the LED 18B only (S416)

After that, the proximity pattern determination section 268 determines whether the both light receiving portions match (S420), and if they match, it determines that the object existing in the intersection range has a planar shape (S424). On the other hand, if the proximity pattern determination section 268 determines that the both light receiving portions do not match (S420), it further determines whether the both light receiving portions are in proximity to each other (S428).

If the both light receiving portions are not in proximity, the proximity pattern determination section 268 determines that the object existing in the intersection range has a less tapered shape such as a fist (S432). If, on the other hand, the both light receiving portions are in proximity, the proximity pattern determination section 268 determines that the object existing in the intersection range has a highly tapered shape such as a finger tip (S436).

(2-5) Summary of the Second Embodiment

As described in the foregoing, according to the second embodiment of the present invention, it is possible to make a determination about the physical shape of an object based on the degree of proximity between the light receiving portion by the LED 18A and the light receiving portion by the LED 18B in the object.

Further, the tip detection system 4 according to the second embodiment of the present invention controls light emission of the LED 18A and the LED 18B in synchronization with the timing to capture the frame image. Then, the tip detection system 4 according to the second embodiment of the present invention calculates a difference between the frame image captured during light emission by the LED 18A and the frame image captured during no light emission at the capture time closest to that of the above frame image or in the same cycle. Likewise, the tip detection system 4 according to the second embodiment of the present invention calculates a difference between the frame image captured during light emission by the LED 18B and the frame image captured during no light emission at the capture time closest to that of the above frame image or in the same cycle. In this configuration, it is possible to continuously detect the light receiving portion accurately even when the ambient lighting conditions and the background image are varying.

(2-6) Supplementary Explanation to the Second Embodiment

The second embodiment of the present invention described above may be altered as appropriate. For example, although the case where the two LEDs 18 (the LED 18A and the LED 18B) are arranged separately from each other in the horizontal direction in such a way that the infrared rays emitted from the LED 18A and the LED 18B intersect is described in the second embodiment, the present invention is not limited thereto. For example, the two LEDs 18 (the LED 18A and the LED 18B) may be arranged separately from each other in the vertical direction in such a way that the infrared rays emitted from the LED 18A and the LED 18B intersect. Further, four or more LEDs 18 may be arranged separately from one another in the vertical direction and the horizontal direction. In such configurations also, it is possible to determine the shape of the object existing in the intersection range of infrared rays more accurately based on the degree of proximity of the light receiving portions during light emission of each LED.

(3) Overall Supplementary Explanation

It should be understood by those skilled in the art that various modifications, combinations, sub-combinations and alterations may occur depending on design requirements and other factors insofar as they are within the scope of the appended claims or the equivalents thereof.

For example, although the case of detecting the position of one hand of an operator is described above, it is equally feasible to detect the positions of both hands of an operator. In this case, the position detection unit may determine which hand each projected image shows based on the positional relationship or the shapes of two projected images in one frame image.

Further, it is not necessary to perform each step in the processing of the position detection system 1 and the tip detection system 4 in chronological order according to the sequence shown in the flowchart. For example, each step in the processing of the position detection system 1 and the tip detection system 4 may include processing that is executed in parallel or individually (e.g. parallel processing or object processing).

Furthermore, it is possible to create a computer program that causes hardware such as a CPU, ROM or RAM that are included in the light emission control unit 16, the PC 20 and the PC 21 to perform the equal functions to each configuration of the light emission control unit 16, the PC 20 and the PC 21 described above. Further, a storage medium that stores such a computer program may be provided. Furthermore, each functional block which is shown in the functional block diagrams of FIGS. 5 and 11 may be implemented by hardware, thereby achieving the series of processing on hardware.

What is claimed is:

1. A position detection system comprising:
an imaging unit for capturing a projected image of an object;
an electromagnetic wave emission unit to emit an electromagnetic wave to the imaging unit,
wherein the electromagnetic wave emission unit comprises a first electromagnetic wave emission unit and a second electromagnetic wave emission unit placed in a different location from the first electromagnetic wave emission unit;
a control unit to control emission of the electromagnetic wave by the electromagnetic wave emission unit; and
a position determination unit, which:
obtains a first projected image of the object based on an image captured during emission of the electromagnetic wave by the first electromagnetic wave emission unit and not by the second electromagnetic wave emission unit, and
obtains a second projected image of the object based on an image captured during emission of the electromagnetic wave by the second electromagnetic wave emission unit and not by the first electromagnetic wave emission unit,
determines a spatial position of the object based on estimating a first straight line connecting the first electromagnetic wave emission unit and a first point of the first projected image of the object,
estimating a second straight line connecting the second electromagnetic wave emission unit and a second point of the second projected image of the object, and
determining an intersection of the first straight line and the second straight line as the spatial position of the object,
wherein the second point of the second projected image corresponds to the first point of the first projected image, and
determines whether the object is a finger or a fist by determining whether a proximity between a pattern in the first projected image and a pattern in the second projected image is greater than a threshold proximity.

2. The position detection system according to claim 1, wherein
the imaging unit captures a frame image in synchronization with a prescribed synchronizing signal, and
the control unit controls emission of the electromagnetic wave by the electromagnetic wave emission unit in synchronization with the prescribed synchronizing signal.

3. The position detection system according to claim 2, wherein
the control unit periodically switches among emission of the electromagnetic wave by the first electromagnetic wave emission unit and no emission of the electromagnetic wave by the second electromagnetic wave emission unit, emission of the electromagnetic wave by the second electromagnetic wave emission unit and no emission of the electromagnetic wave by the first electromagnetic wave emission unit, and no emission of the electromagnetic wave by the first electromagnetic wave emission unit and the second electromagnetic wave emission unit, and
the position determination unit obtains the first projected image of the object based on a difference between the image captured during emission of the electromagnetic wave by the first electromagnetic wave emission unit and not by the second electromagnetic wave emission unit and an image captured during no emission of the electromagnetic wave by the first electromagnetic wave emission unit and the second electromagnetic wave emission unit, and obtains the second projected image of the object based on a difference between the image captured during emission of the electromagnetic wave by the second electromagnetic wave emission unit and not by the first electromagnetic wave emission unit and an image captured during no emission of the electromagnetic wave by the first electromagnetic wave emission unit and the second electromagnetic wave emission unit.

4. The position detection system according to one of claims 1, 2, and 3, further comprising:
a filter to transmit a wavelength component of the electromagnetic wave emitted from the electromagnetic wave emission unit, wherein
the first projected image or the second projected image is the image formed by the filtered electromagnetic wave on the imaging unit.

5. The position detection system according to one of claims 1, 2, and 3, wherein the electromagnetic wave emission unit emits infrared rays or visible rays.

6. A position detection method comprising the steps of:
obtaining
a first projected image of the object on an imaging unit, which is based on an image captured during emission of an electromagnetic wave by a first electromagnetic wave emission unit and not from a second electromagnetic wave emission unit, and
a second projected image of the object on the imaging unit, which is based on an image captured during emission of an electromagnetic wave by the second electromagnetic wave emission unit and not from the first electromagnetic wave emission unit; and
determining a spatial position of the object based on estimating a first straight line connecting the first electromagnetic wave emission unit and a first point of the first projected image of the object,
estimating a second straight line connecting the second electromagnetic wave emission unit and a second point of the second projected image of the object, and
determining an intersection of the first straight line and the second straight line as the spatial position of the object,
wherein the second point of the second projected image corresponds to the first point of the first projected image, and determining whether the object is a finger or a fist by determining whether a proximity between a pattern in the first projected image and a pattern in the second projected image is greater than a threshold proximity.

7. The method according to claim 6 further comprising:
capturing an image in synchronization with a prescribed synchronizing signal, and controlling emission of the electromagnetic wave by at least one of the first electromagnetic wave emission unit and the second electromagnetic wave emission unit in synchronization with the prescribed synchronizing signal.

8. The method according to one of claims 6 and 7 further comprising:
   filtering the electromagnetic wave emitted by at least one of the first electromagnetic wave emission unit and the second electromagnetic wave emission unit for a wavelength component, and
   capturing the image formed on the imaging unit by the filtered electromagnetic wave.

9. The method according to one of claims 6 and 7, further comprising:
   emitting infrared rays or visible rays by at least one of the first electromagnetic wave emission unit and the second electromagnetic wave emission unit.

10. The position detection method of claim 6, further comprising:
    periodically switching among emission of the electromagnetic wave by the first electromagnetic wave emission unit and no emission of the electromagnetic wave by the second electromagnetic wave emission unit, emission of the electromagnetic wave by the second electromagnetic wave emission unit and no emission of the electromagnetic wave by the first electromagnetic wave emission unit, and no emission of the electromagnetic wave by the first electromagnetic wave emission unit and the second electromagnetic wave emission unit; and
    obtaining the first projected image of the object based on a difference between the image captured during emission of the electromagnetic wave by the first electromagnetic wave emission unit and not by the second electromagnetic wave emission unit and an image captured during no emission of the electromagnetic wave by the first electromagnetic wave emission unit and the second electromagnetic wave emission unit, and obtaining the second projected image of the object based on a difference between the image captured during emission of the electromagnetic wave by the second electromagnetic wave emission unit and not by the first electromagnetic wave emission unit and an image captured during no emission of the electromagnetic wave by the first electromagnetic wave emission unit and the second electromagnetic wave emission unit.

11. A non-transitory computer readable medium storing a program that causes a computer to implement functions comprising:
    a control section configured to control emission by a first electromagnetic wave emission unit and emission by a second electromagnetic wave emission unit;
    a projected image determination section configured to obtain a first projected image of an object on an imaging unit, which is based on an image captured during emission of an electromagnetic wave by the first electromagnetic emission unit and not from the second electromagnetic emission unit, the object being located between the first electromagnetic wave emission unit and the imaging unit,
    the projected image determination section further obtaining a second projected image of the object on the imaging unit, which is based on an image captured during emission of an electromagnetic wave by the second electromagnetic emission unit and not from the first electromagnetic emission unit, the object being located between the second electromagnetic wave emission unit and the imaging unit; and
    a position determination section to:
    determine a spatial position of the object based on estimating a first straight line connecting the first electromagnetic wave emission unit and a first point of the first projected image of the object,
    estimating a second straight line connecting the second electromagnetic wave emission unit and a second point of the second projected image of the object, and
    determining an intersection of the first straight line and the second straight line as the spatial position of the object,
    wherein the second point of the second projected image corresponds to the first point of the first projected image, and
    determining whether the object is a finger or a fist by determining whether a proximity between a pattern in the first projected image and a pattern in the second projected image is greater than a threshold proximity.

12. The position detection method of claim 11, wherein:
    the control section periodically switches among emission of the electromagnetic wave by the first electromagnetic wave emission unit and no emission of the electromagnetic wave by the second electromagnetic wave emission unit, emission of the electromagnetic wave by the second electromagnetic wave emission unit and no emission of the electromagnetic wave by the first electromagnetic wave emission unit, and no emission of the electromagnetic wave by the first electromagnetic wave emission unit and the second electromagnetic wave emission unit; and
    the projected image determination section obtains the first projected image of the object based on a difference between the image captured during emission of the electromagnetic wave by the first electromagnetic wave emission unit and not by the second electromagnetic wave emission unit and an image captured during no emission of the electromagnetic wave by the first electromagnetic wave emission unit and the second electromagnetic wave emission unit, and obtains the second projected image of the object based on a difference between the image captured during emission of the electromagnetic wave by the second electromagnetic wave emission unit and not by the first electromagnetic wave emission unit and an image captured during no emission of the electromagnetic wave by the first electromagnetic wave emission unit and the second electromagnetic wave emission unit.

* * * * *